(12) United States Patent
Tilton et al.

(10) Patent No.: US 9,582,080 B1
(45) Date of Patent: Feb. 28, 2017

(54) METHODS AND APPARATUS FOR LEARNING SENSOR DATA PATTERNS FOR GESTURE-BASED INPUT

(71) Applicant: Rithmio, Inc., Champaign, IL (US)

(72) Inventors: Adam K. Tilton, Bartonville, IL (US); Shane T. Ghiotto, St. Charles, IL (US); Prashant G. Mehta, Urbana, IL (US)

(73) Assignee: RITHMIO, INC., Champaign, IL (US)

( * ) Notice: Subject to any disclaimer, the term of this patent is extended or adjusted under 35 U.S.C. 154(b) by 0 days.

(21) Appl. No.: 14/751,073

(22) Filed: Jun. 25, 2015

Related U.S. Application Data

(60) Provisional application No. 62/017,227, filed on Jun. 25, 2014, provisional application No. 62/017,229, filed on Jun. 25, 2014.

(51) Int. Cl.
 *G09G 5/00* (2006.01)
 *G06F 3/01* (2006.01)
(52) U.S. Cl.
 CPC .............. *G06F 3/017* (2013.01); *G06F 3/011* (2013.01)
(58) Field of Classification Search
 CPC .... G06F 3/04883; G06F 3/017; G06F 3/0481; G06F 3/041
 USPC .................. 345/173–178, 156–157; 715/863
 See application file for complete search history.

(56) References Cited

U.S. PATENT DOCUMENTS

| | | | |
|---|---|---|---|
| 7,877,226 B2 | 1/2011 | Chan | |
| 8,073,707 B2 | 12/2011 | Teller | |
| 8,398,546 B2 | 3/2013 | Pacione | |
| 8,446,275 B2 | 5/2013 | Utterll | |
| 8,446,378 B2 | 5/2013 | Moll-Carrillo | |
| 8,463,576 B2 | 6/2013 | Yuen | |
| 8,487,896 B1* | 7/2013 | Brown ................. | G06F 3/0418 345/173 |
| 8,568,310 B2 | 10/2013 | Kahn | |
| 8,579,827 B1 | 11/2013 | Rulkov | |
| 8,610,582 B2 | 12/2013 | Jeon | |
| 8,775,120 B2 | 7/2014 | Molettiere | |
| 8,801,577 B2 | 8/2014 | Dibenedetto | |
| 8,805,646 B2 | 8/2014 | Messenger | |
| 8,894,253 B2 | 11/2014 | Rowlette, Jr. | |
| 8,942,953 B2 | 1/2015 | Yuen | |
| 9,031,812 B2 | 5/2015 | Roberts | |
| 9,063,164 B1 | 6/2015 | Yuen | |
| 9,077,314 B2 | 7/2015 | Mehta | |
| 9,087,234 B2 | 7/2015 | Hoffman | |
| 2007/0143068 A1 | 6/2007 | Pasolini | |
| 2007/0219059 A1 | 9/2007 | Schwartz | |
| 2011/0165998 A1 | 7/2011 | Lau | |
| 2012/0206380 A1* | 8/2012 | Zhao .................. | G06F 3/04883 345/173 |
| 2013/0190903 A1 | 7/2013 | Balakrishnan | |

(Continued)

*Primary Examiner* — Jennifer Nguyen
(74) *Attorney, Agent, or Firm* — Invention Mine LLC

(57) ABSTRACT

Methods and systems for learning, recognition, classification and analysis of real-world cyclic patterns using a model having n oscillators, with primary frequency $\omega_1, \omega_2, \ldots, \omega_n$. The state of the oscillators is evolved over time using sensor observations, which are also used to determine the sensor characteristics, or the sensor observation functions. Once trained, a set of activity detection filters may be used to classify sensor data as being associated with an activity.

20 Claims, 17 Drawing Sheets

(56) References Cited

U.S. PATENT DOCUMENTS

| | | |
|---|---|---|
| 2014/0257533 A1 | 9/2014 | Morris |
| 2014/0275821 A1 | 9/2014 | Beckman |
| 2014/0288870 A1 | 9/2014 | Donaldson |
| 2015/0091832 A1* | 4/2015 | Mizunuma ............ G06F 3/0488 345/173 |
| 2015/0153835 A1* | 6/2015 | Perez ...................... G06F 3/017 345/156 |

* cited by examiner

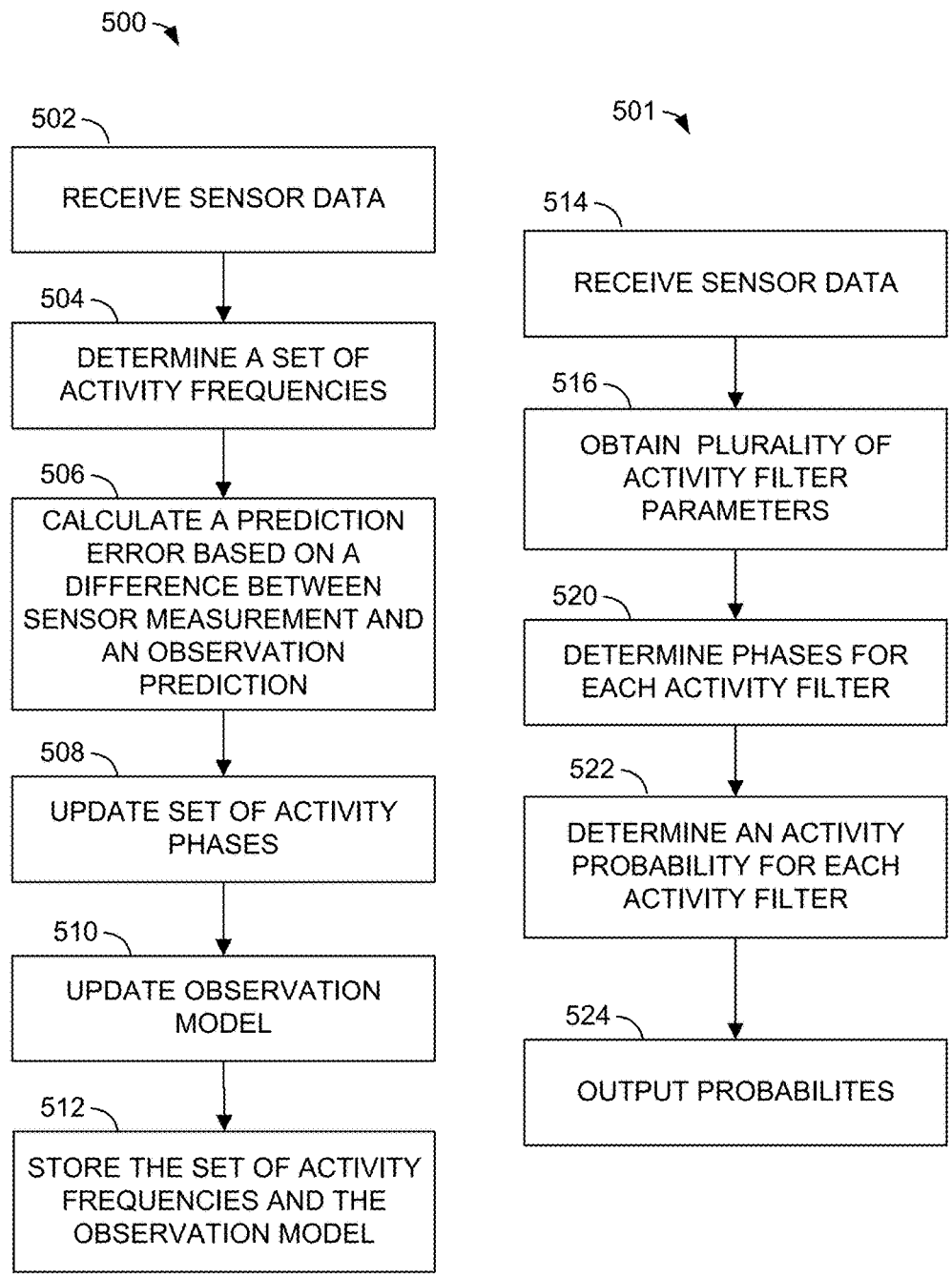
Fig. 5A                    Fig. 5B

METHODS AND APPARATUS FOR LEARNING SENSOR DATA PATTERNS FOR GESTURE-BASED INPUT

The present application is a non-provisional filing of, and claims benefit under 35 U.S.C. §119(e) from, U.S. Provisional Patent Application Ser. No. 62/017,227, filed Jun. 25, 2014, and U.S. Provisional Patent Application Ser. No. 62/017,229, filed Jun. 25, 2014. The contents of those applications are incorporated herein by reference in their entirety. This application further incorporates herein by reference the following applications filed on Jun. 25, 2015: U.S. application Ser. No. 14/751,084, filed Jun. 25, 2015, entitled METHODS AND APPARATUS FOR RECOGNITION OF SENSOR DATA PATTERNS; U.S. application Ser. No. 14/751,082, filed Jun. 25, 2015, entitled METHODS AND APPARATUS FOR LEARNING SENSOR DATA PATTERNS OF HISTORICAL SENSOR DATA; U.S. application Ser. No. 14/751,075, filed Jun. 25, 2015, entitled METHODS AND APPARATUS FOR LEARNING SENSOR DATA PATTERNS OF A MECHANICAL SYSTEM IN A FAILURE MODE; and U.S. application Ser. No. 14/751,071, filed Jun. 25, 2015, entitled METHODS AND APPARATUS FOR LEARNING SENSOR DATA PATTERNS OF PHYSICAL-TRAINING ACTIVITIES.

BACKGROUND OF THE INVENTION

The forms of computing and electronic devices are changing rapidly and so too are means for interfacing with said devices. In the past the mouse and keyboard were the industry standard for input means however advanced technologies allow for novel possibilities. Voice input and gesture input are two newer methods for establishing a human-machine interface (HMI).

It is important to be able to train computing and robotic devices to learn recognize unique gestures and voice commands and responsively execute desired functionality. For example, a voice command for launching a web browser such as "open web browser" could be used instead of or alongside traditional techniques (e.g., a mouse double click of an application icon). Additionally, physical gestures may be used to perform various tasks as well. Furthermore, control of robotic devices such as industrial robots, radio control cars, drones, 3D printers and the like may be gesture based as well.

The general approach used by many prior technologies consists of three steps: (a) Identification of a 'feature vector' for a given (a priori fixed) set of activities; (b) Offline training of a model for this feature vector based on sensor data from a single or multiple users; and (c) Online recognition of the activity based on online computation of features from the sensor data and its comparison against the trained model. The main problems with this approach are as follows:

1. Feature selection: The performance of these algorithms critically depends upon selection of 'good' features. Selecting features from sensor data is not an easy task. The usefulness of any given feature is dependent in a highly nonlinear manner on the activity, on the sensor, on the placement of a sensor on the body and possibly also on the subject [17, 18]. The number of features, however, can quickly grow in size—as many as 600 features are available in MSP [4].

The need to select a small number of 'good' features in an a priori manner is the main reason why existing solutions are limited to pre-programmed activities.

2. Large training data set requirement: For a given set of features, training a good model (e.g., decision tree [25, 5, 2]) requires a large amount of data. In practice, one collects a rich enough data set from multiple users to train these models [26, 9, 20, 8, 12]. This is a costly and time-intensive process. With data from just a single user, the resulting model can be fragile (e.g., sensitive to changes in frequency of the activity). With a large number of users, the model-fit to any particular user may be poor.

3. Accuracy: Once the models have been trained, the classification is typically the easiest step. Popular methods such as template matching using e.g., nearest neighbor classifiers (used by MotionX; cf., [13, 20]) and the decision tree classifier (an industry standard; cf., [25, 5, 2, 11, 8, 22, 27]) can be run very efficiently. Other popular algorithmic approaches include: instance based learning (IBL) approaches [25, 5, 28]; Bayesian networks (BN) [29, 9, 30] and Naive Bayes (NB) classifiers [8, 3, 14, 31]; support vector machines (SVM) [32, 15, 21, 33]; fuzzy If-Then rules [10, 24, 6] and artificial neural networks (ANN) [29, 12, 34].

However, these approaches suffer from the issue of robustness: the conditions for online data and the training data must be closely matched (in terms of number of sensors, window length of data, features, even subjects) for the results to be accurate; cf., [35, 5, 36, 25, 24, 37]. Many classifier approaches such as IBL and ANN can be non-robust and do not provide information on activity counts or duration, etc. [27, 33, 34].

In open literature, probabilistic approaches such as regression methods [7, 9], hidden Markov models (HMM) [38, 14] and multi-graph based techniques [39, 16] have also been considered, but their practical application suffer from the curse of dimensionality, e.g., results reported in [39, 16] lead to a graph size of 16,875 nodes making it computationally prohibitive. A simple four state HMM with five independent sensor measurements requires a total of 50 parameters that need to be learned (a specific example of this appears in [40]). This requires a large amount of training data to learn (identify) the parameters, and the problem is known to be non-convex with multiple local minima for parameters; cf., [41].

Accordingly, there is a need for methods and systems for learning sensor data patterns for input and control of electronic systems.

BRIEF SUMMARY OF THE INVENTION

In one embodiment, there is a method for generating a gesture-detection (GD) filter. The method includes receiving sensor data captured by at least one sensor during a gesture, the at least one sensor selected from the group consisting of (i) a motion sensor that is attached to a user, (ii) a motion sensor that is attached to a user equipment, (iii) an audio sensor, and (iv) an electrode array attached to a head of the user, the sensor data comprising a plurality of sequential sensor measurements. The method also includes determining a set of activity frequencies associated with the sensor data received during the gesture. The method also includes iteratively calculating: (i) a prediction error based on a difference between at least one of the plurality of sequential sensor measurements and an observation prediction $\hat{h}_r$ from an observation model, the observation model operating on phases in a set of phases associated with the set of activity frequencies; (ii) an updated set of estimated activity phases based on the prediction error and the set of activity frequencies; and (iii) an updated observation function of the observation model based on the prediction error. The method also includes generating the GD filter based at least in part of the set of activity frequencies and the updated observation function.

In one embodiment, there is an apparatus comprising a tangible, non-transitory computer-readable medium having instructions stored thereon that when executed cause a processor to execute the functions set forth above.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5A depicts an example method for gesture-detection filter training.

FIG. 5B depicts an example method for activity classification.

Figure 1:
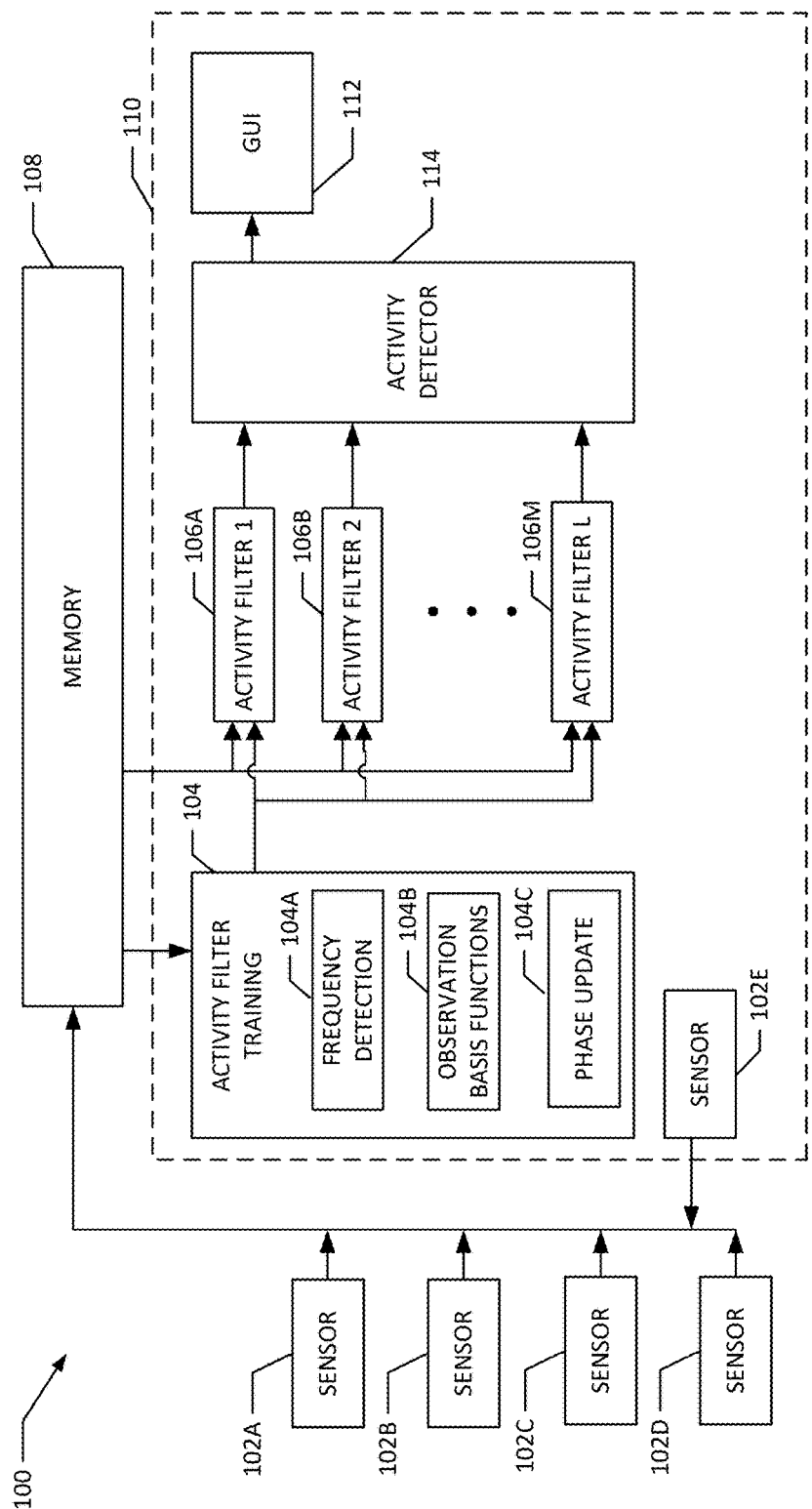
FIG. 1 depicts an example system for gesture-detection filter training and gesture detection, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for learning, recognition, classification and analysis of real-world cyclic patterns, based only on sensor data. In particular, disclosed herein are methods and systems for learning, recognition, classification and analysis of gesture-detection filters. Cyclic patterns are patterns that repeat—in an almost periodic but noisy manner—with respect to some independent coordinate (e.g., time). The sensor data is assumed to be available with respect to the same coordinate. Note that these patterns might not be stationary or periodic. An example of temporal cyclic patterns are gestures/physical activities such as hand gestures (e.g, hand swipe, wrist twist), arm gestures, head gestures, vocal gestures (e.g., voice commands), audible gestures (e.g., clapping, snapping, whistling, etc.), and mental gestures based on thoughts or thought patterns. The sensors may be attached to a human body, or complex machine, or a combination of human and mechanical systems, and the like. In each of these cases, the independent coordinate is time and the time-series sensor data may be from motion sensors, e.g., accelerometers, gyroscopes, etc and/or audio sensors, e.g., microphones and/or an electrode array of an electroencephalograph.

At least part of the motivation behind the systems and processes described herein is the desire to be able to produce a unique identifier for a particular sound-based and/or gesture-based (physical, audible, and or mental) user input. An example use case of the systems and processes described herein includes the following high-level steps. First a user and/or a user equipment is outfitted with at least one motion sensor and/or at least one audio sensor. Motion sensors may be attached to various parts of the user. Those with skill in the relevant art will appreciate that more intricate gestures will require larger numbers of motion sensors. For example, if the gesture is a wave of the hand a single motion sensor on the wrist will suffice, however if the gesture is a particular motion of fingers (e.g., the middle finger and pointer finger being raised up and down in unison) motion sensors on both the middle finger and pointer finger may be required. The user performs the physical-gesture and/or audio-gesture and the various sensors capture sensor data. This sensor data is used to generate a gesture-detection (GD) filter corresponding to the performed gesture. The user may then associate this gesture with a certain computer task such as launching a web browser or robotic movement (e.g., the activation of a servo-motor). In this manner, a user may produce a large number of gesture-driven "shortcuts" for performing associated computer tasks as well as gesture-driven control means for the operation of robotic equipment. When interfacing with the computer the user may perform these trained gestures in order to execute associated computer tasks or sets of tasks. When interfacing with the robotic system the user may perform these trained gestures in order to execute associated robotic movements or sets of movements.

A computer may take the form of a desktop, a laptop, a smartphone, a tablet, a smartwatch, a media control system such as an a/v receiver or a pre-amp, a TV, a stereo, and the like. A robotic system may take the form of an industrial robot, a remote control toy (e.g., RC car, RC boat, RC plane, RC helicopter, etc.), a drone, a 3D printer, a robotic exoskeleton, an autonomous vehicle such as a plane, car, boat, etc., and other robotic systems could be listed by those with skill in the relevant art.

Examples of physical-gestures include a single-hand gesture (e.g., a wave, a salute, a thumbs up, various finger patterns, a swipe, a palm up, a palm down, a pointing using a particular finger, a swag of a finger. a first pump, a circular motion of an arm, a circular motion of an arm while holding an object (e.g., smartphone, laser pointer), etc.), a two-hand gesture (e.g., a two thumbs up, beating of the chest, both arms raised, both arms extended forward, both arm extended sideways, the monkey, prayer hands, etc.), a head gesture (e.g., a nod—yes, a shake of the head—no, a tilt of the head, etc.), a full body gesture (e.g., a jump, sitting down, standing up, spinning in a circle clockwise, spinning in a circle counterclockwise, kneeling down, etc.), and a user-equipment assisted gesture—which requires sensors in/on the user equipment (e.g., a twirl of a baton, writing of a certain character or word with a writing instrument, opening or closing of a book, etc.). Of course many other physical gestures could be listed as well. Combinations of physical gestures may be used.

Examples of audible-gestures include a spoken word (e.g., yes, no, start, stop, quit, back, minimize, play, pause, mute, copy, cut, paste, etc.), a spoken phrase (e.g., launch web browser, shut down, fast forward, volume up, volume down, exit application, minimize application, show me the setting menu, etc.), a vocal sound (e.g., a whistle, a tongue click, a hum, etc.), a vocal sound pattern (e.g., humming three times in a row, whistling twice, a grunt-whistle-grunt pattern, etc.), a tone of voice (e.g., a pitch of a musical note, a timber of a vocal excitation, etc.), a tonal vocal pattern (e.g., humming a pattern of notes, singing a lyric, whistling a jingle, etc.), and a non-vocal user-produced sound (e.g., a clap, a snap, a rhythm of claps, a rhythm of snaps, etc). Of course many other audible gestures could be listed as well. Combinations of physical gestures may be used. Furthermore, combinations of physical and audible gestures can be used.

Furthermore, mental gestures including thoughts and thought patterns of a user (the sensor measurements associated with the mental gesture being captured by an electrode array secured to the head of a user i.e., an electroencephalograph) may be used in replace of or in addition to the various physical gestures and audible gestures. Externally induced thoughts (e.g., having the user view a red computer screen, listen to a song, etc.) are other forms of mental-gestures.

A recorded gesture may be associated with a specific sound, thus enabling the ability to create an "invisible band". The systems and processes described herein may record hand movements (e.g., drum set playing-patterns, guitar chord shapes, piano chord shapes, etc.), generate GD filters, and associate these filters with different drum beats, guitar chords, piano riffs, and the like. A user may choose which sounds correspond with each movement/gesture via a corresponding application (e.g., a smartphone application). The application may detect recorded gestures and playback the associated sound. The end result would be the creation of invisible musical instruments powered by the person's physical movements and audible via a corresponding application.

Examples of computer tasks include opening an application, closing an application, minimizing an application, switching applications, navigating a user interface, multimedia-playback control, text input, keyboard keystrokes, mouse movement, shutting down a computer, closing background applications, navigating to a previous user interface view, etc. Of course many other computer tasks could be listed as well. Combinations computer tasks may be used. Any gesture or combination of gestures may be associated with any computer task or combination/series of computer tasks. It is the case that all computer tasks may be performed via a time-sequenced combination of keyboard keystrokes, mouse movements, mouse clicks and scrolls, touch inputs, stylus inputs, gaming-peripheral inputs such as joystick inputs, music-production-peripheral inputs such as midi inputs, generic macro-enabled button presses, and the like. In some embodiments gestures are associated with emulated/virtual versions of the above listed traditional input means or time-sequenced combinations thereof.

Examples of robotic tasks include activating a motor or a servo-motor to rotate in a certain direction, activating a servo-motor to rotate through a certain angle, activating a motor or a servo-motor to rotate at a certain speed, activating a linear actuator to move in a certain direction, activating a linear actuator to move a certain distance, activating a linear actuator to move at a certain speed.

For the balance of this document, the terms sensor data, activity, and activity-detection filter are used throughout. Sensor data may refer to data captured by one or more sensors or to historical data generated via a plurality of means. Historical data may be generated via sensors and stored in a data store. In some cases this data is generated by systems that track and document certain trends (e.g., financial data—market price of an asset or fund, and website traffic data). Sensor data is indicative of an activity. Examples of activities include walking, a golf swing, a physical-gesture, a sonic-gesture, a mental-gesture, a gesture input to a computer user interface, a gesture input to a robotic system, physical and sonic oscillations of mechanical systems, bar bell curls, push-ups, swimming, a tennis stroke etc. For activity-detection filter (sometimes shortened to activity filter) generation, sensor data is analyzed at one or more computing units. Each activity-detection filter is associated with an activity that corresponds with the sensor data used to generate that filter.

The activity associated with the sensor data may be known during the sensor data capture process, or may be indicated post-sensor-data capture by a user via a user interface. In at least one embodiment the activity associated with the sensor data is indicated before the sensor data is received and before the activity-detection filter is generated. In at least one embodiment the activity associated with the sensor data is indicated after the sensor data is received and before the activity-detection filter is generated. In at least one embodiment the activity associated with the sensor data is indicated after the sensor data is received and after the activity-detection filter is generated. The various sensor data used to generate a single activity-detection filter must be sensor data indicative of a common activity. In scenarios in which the activity associated with the sensor data is indicated after the sensor data is received and after the activity-detection filter is generated, a grouping algorithm may be performed in an attempt to group sensor data indicative of a common activity. Many cluster analysis algorithms may be implemented to achieve this such expectation maximization, k-means, and DBSCAN. Biclustering algorithms may provide advantages over other techniques due to the plural number of independent dimensions encoded in time-signal sensor data (e.g., frequency information and amplitude information). Furthermore, for this purpose, individual time intervals of sensor data may be converted into repetitive signals and used to generate temporary activity-detection filters. The parameters of various temporary activity-detection filters may be analyzed to search for similar temporary activity-detection filters. The grouping of sensor data may comprise identifying sensor data which generated similar temporary activity-detection filters.

Once generated, activity-detection filters may be used to analyze real-time sensor data or historical sensor data. Each operational activity-detection filter will output a probability that the sensor data run through a given filter is indicative of the activity associated with that filter. In this manner, activity-detection filters can determine an activity associated with received sensor data even though the received sensor data has no direct indication of the associated activity.

Sensors may take on a large variety of forms. The data captured by various sensors may be a function with respect to time or a function with respect to position. Possible sensor types include: single-axis accelerometers, three-axis accelerometers, single-axis gyroscopes, three-axis gyroscopes, pressure sensors, temperature sensors, humidity sensors, molecular (chemical) sensors (which determine a parts-per-million of a particular molecule), seismographs, polygraph machines, electrodes, electrodes of an electroencephalogram, light sensors (e.g., an infrared sensor, ultra-violet sensor, x-ray sensor, etc,), light field sensors, image sensors (e.g., a CCD), position sensors (e.g., a GPS, GLONASS, etc.) and other types of sensors could be listed as well as would be known by those with skill in the relevant art. Sensors may be located on/in a user or on/in an external device (e.g., a wearable device, a smartphone, a tablet, a sporting equipment such as a baseball bat, tennis racquet, football, protective pads and gear such as a helmet or football pads, etc.). Sensors located on a user are typically fastened to the user through use of a wearable device such as a smart wristband, smart headband, a piece of clothing, a ring, an ankle bracelet, a belt, shoes, cleats, and the like but may be implanted in a user, glued to a user, etc. if desired. The sensors may be placed on a wrist, shoulder, ankle, finger, thigh, and head, embedded in a piece of clothing or band, and other such locations and fastening means could be listed as well. A plurality of sensors may be positioned in a variety of locations. Generally speaking, a greater number of sensors allows for a more detailed representation of a user/user equipment movement (i.e., activity or gesture).

In the following portion of this disclosure a discussion will be provided with respect to transportation of sensor data from at least one sensor to at least one sensor data processing unit. In some embodiments, a sensor is collocated with a processing unit. An example of such is a fitness band worn around the wrist of a user. The fitness band includes at least one sensor and a processing unit for generating activity filters and recognizing activities through use of existing activity filters. The fitness band may include a display and/or may transmit information to an external display via a wireless communication interface. In embodiments involving more than one sensor a few techniques may be implemented in order to process respective sensor data. In one example each sensor includes a communication interface configured to transmit sensor data to a common processing unit. The processing unit may be collocated with one of the plurality of sensor or may be a standalone device. The processing unit can perform activity filter generation using the collected sensor data and activity detection using existing activity filters. In another example each sensor includes a respective processing unit and is in direct or indirect communication with each other sensor. In such an example the sensor data collected by each sensor may be independently used to update and observation function at the respective processing units. The updated observation function, a difference between the prior observation function and the updated observation function, or an encoded representation thereof at one sensor is transmitted to another sensor and that other sensor updates the observation function once more using its collected sensor data. This process continues so that each sensor can provide updates to the observation function. Each processing unit may check for a convergence of an observation model as it updates the observation function. Analogous processes may take place with respect to activity detection.

One embodiment is shown with respect to FIG. 1. The apparatus 100 includes a processor 110 connected with a processor memory 108 as well as a plurality of sensors 102A, 102B, 102C, 102D, and 102E (which is a software-supplemented sensor). More or fewer sensors may be used. The sensors may provide a time-sequence of values. Although examples herein describe temporal patterns, alternatives within the scope of the described methods include recognition of spatial patterns such as images where the independent coordinate are the spatial (x, y) coordinates—are also relevant. Thus, in many examples herein, the independent coordinate is time, denoted as t, but other coordinates may be used for one or more sensors. Still further embodiments may utilize one or more soft sensors such as 102E that perform supplemental sensor processing to obtain a final sensor observation sample. One such example is video recognition systems that may identify human faces, hands, fingers, or positions of various human joints. The sensor information in some embodiments may therefore correspond to the time-sequence of a hand position (x, y) derived from a video sequence, or a pattern of eye blinks, to name just two such examples. Other such soft sensors are known in the art.

With respect to FIG. 1, sensor data from memory 108 (or sensor data received directly from one or more sensor devices 102A-E) is received and processed by the activity filter training module 104. The activity filter training module 104 may include a frequency detection module 104A, an observation function module 104B (which may use basis functions) and a phase update module 104C. During a training period, the activity filter training module obtains parameters used by activity filters 106A, 106B, . . . 106M. In at least one embodiment the activity filters 106A, 106B, . . . 106M are GD filters. During an activity classification operation period, the activity filters 106A-M operate on the sensor data and provide outputs to the activity detector module 114. The activity filters operate using a parameter set including a set of primary frequencies and observation function parameters such as basis function coefficients. The activities that are to be detected may correspond to human activities such as walking, jogging, push-ups, sit-ups, and other exercise activities, as well as gestures used in human machine interface. The activity filters are able to detect so-called "one-off" gestures such as a hand swipe, wrist twist, etc. In some embodiments, machine activities may be detected, including not just a desired activity (e.g., motion sequence of a robotic arm performing a desired activity) but also undesired activities, such as those corresponding to one or more failure modes of a device. That is, some machines tend to fail in particular ways that may be identifiable using an activity filter. The activity detector module 114 provides an indication as to which activity has been detected, and the results may be provided to a user via a graphical user interface GUI 112.

Note that various hardware elements of one or more of the described embodiments are referred to as "modules" that carry out (i.e., perform, execute, and the like) various functions that are described herein in connection with the respective modules. As used herein, a module includes any necessary hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module also includes any necessary instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Figure 2:
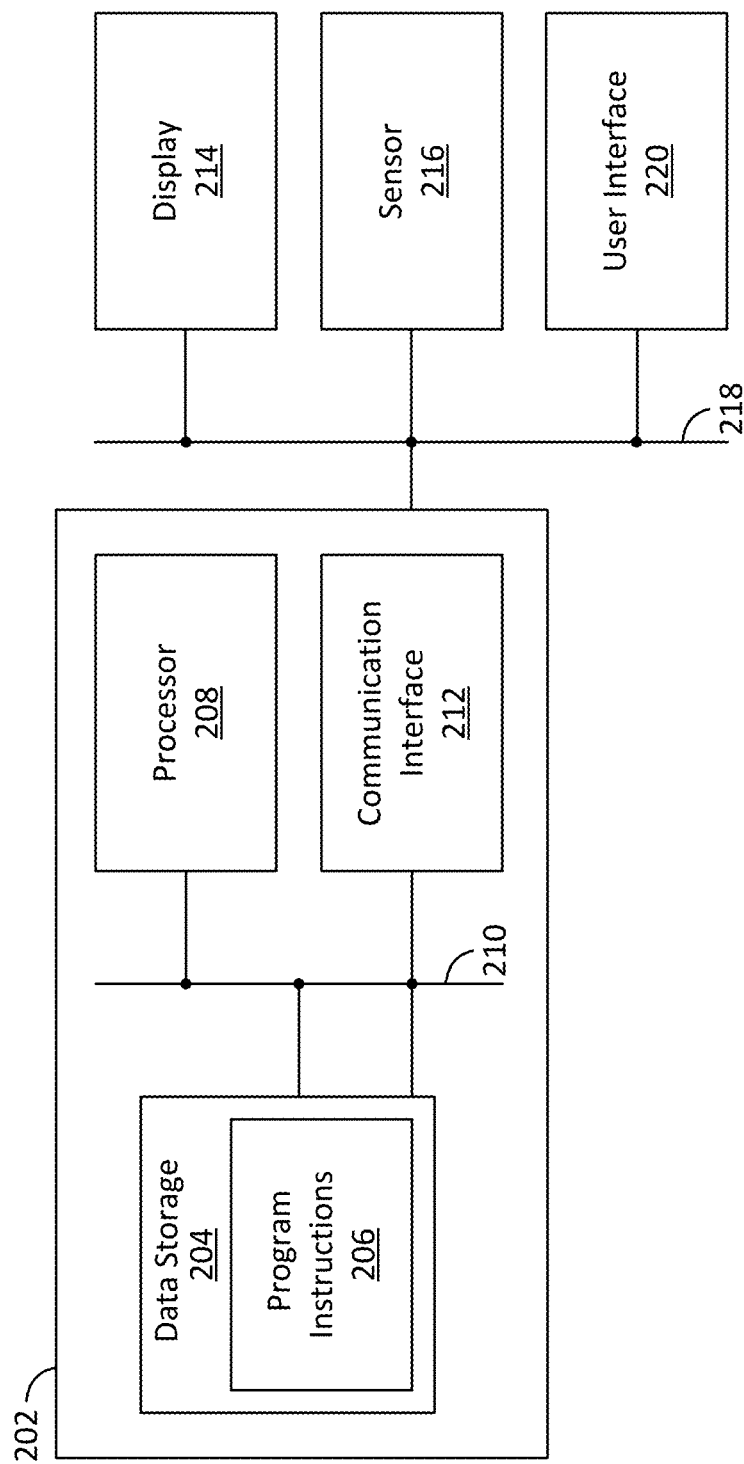
FIG. 2 depicts an example computing and communication device, in accordance with an embodiment.
Figure 3:
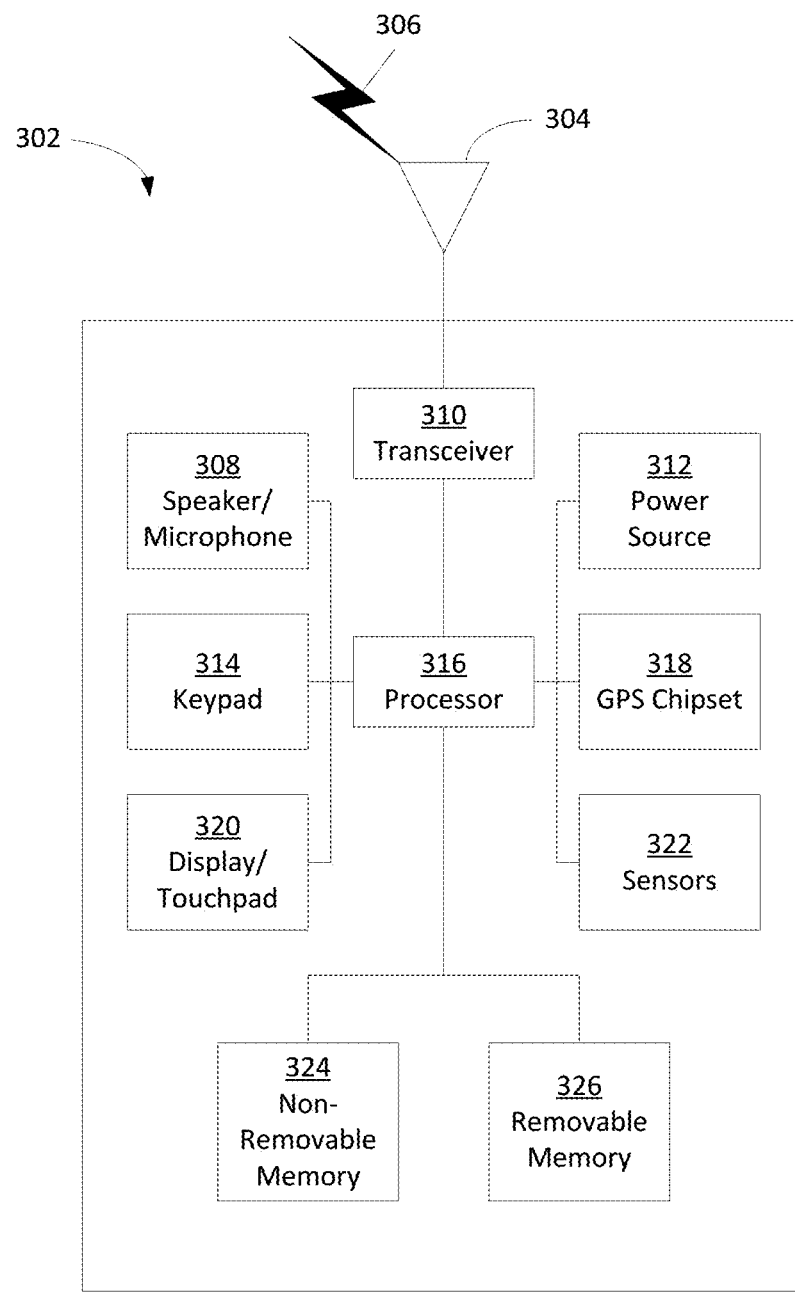
FIG. 3 depicts a first example wireless computing and communication device, in accordance with an embodiment.

A computing platform that may be used in one or more embodiments is shown in FIG. 2, which includes a processing platform 202 having a processor 208, a data storage 204 for storing program instructions 206, and a communication interface 212 for communicating with peripheral devices. The peripheral devices may include a display 214, one or more sensors 216, and a user interface 220, such as a keyboard, touch screen, mouse, joystick or other device for providing user input/output. Devices using the methods described herein may also include a wireless device such as a smartphone 302, as depicted in FIG. 3, which includes a transceiver 310 for communicating wirelessly (306) over antenna 304. The smartphone may include a speaker 308, a keypad 314, a display 320, processor 316, power source 312, GPS chipset 318, sensors 322, and memory 324, 326.

In a typical smartphone architecture, the sensor data is accessible through a framework. For example, the Android sensor framework lets you access both hardware-based and software-based sensors. Hardware-based sensors are physical components built into a handset or tablet device. They derive their data by directly measuring specific environmental properties, such as acceleration, geomagnetic field strength, or angular change. On the other hand, software-based sensors are not physical devices, although they mimic hardware-based sensors. Software-based sensors derive their data from one or more of the hardware-based sensors and are sometimes called virtual sensors or synthetic sensors. The linear acceleration sensor and the gravity sensor are examples of software-based sensors. The Android system provides the following classes and interfaces: SensorManager, Sensor, SensorEvent, and SensorEventListener. Other examples of sensor data access are known in the art.

Figure 4:
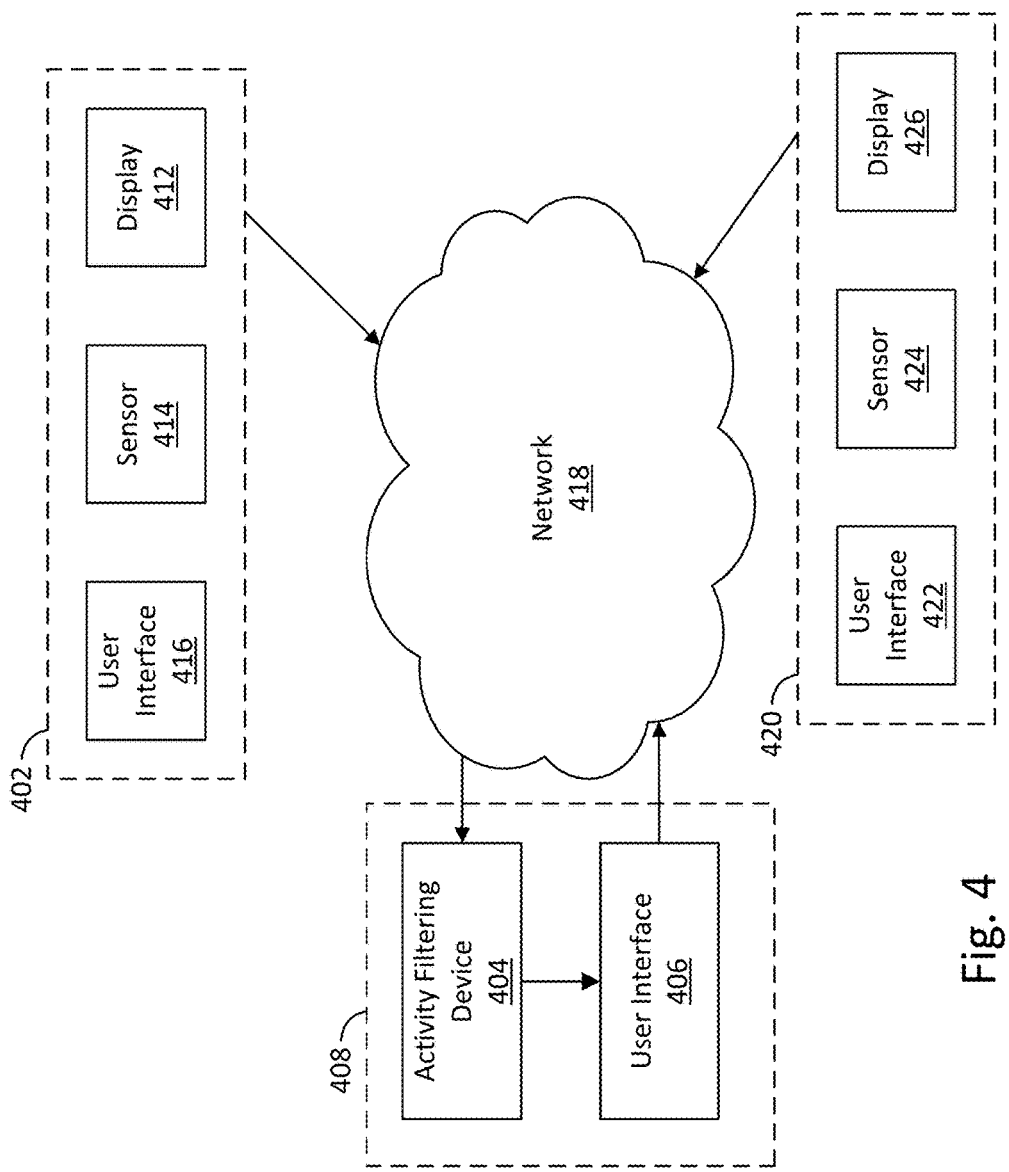
FIG. 4 depicts an example networked scenario involving remote sensors, in accordance with an embodiment.

In addition, the modules may be distributed across a plurality of computer platforms, servers, terminals, and the like. A given module may even be implemented such that the described functions are performed by separate processors and/or computing hardware platforms. In particular, with reference to FIG. 4, a system 400 is depicted that shows a distributed system of one or more sensors 402, 420 connected by way of a network 418 to the computer 408 including Activity Filtering device 404, and which may also include a user interface 406. Each sensor may a simple sensor 414, 424, or they may be configured to include a user interface 416, 422, and/or a display device 412, 426. In one embodiment, the sensors 414, 424, obtain measurements of automated equipment such as assembly line devices, including robotic arms and other movable objects. The sensor data is provided to a centralized processor 408 for activity detection and classification.

For cyclic patterns, three types of algorithms and associated software tools are described herein:
1. Supervised learning of cyclic patterns: A system has been developed to automatically learn a new pattern from a given sensor data.
2. Real-time recognition and classification of cyclic patterns: Once trained, the system can accurately recognize and classify patterns from sensor data.
3. Real-time analytics: After the pattern has been correctly recognized, the system provides real-time analytics, e.g., count of cycles, speed, variations from a baseline, etc. One analytic of particular interest in a path efficiency of a user/user equipment motion. Sensor data may be used to generate a virtual 3-D path of the user and/or user equipment and the action of the virtual path may be compared to a hypothetical/theoretical optimally efficient path.

An algorithm for learning a cyclic pattern from data is described herein. Various embodiments has been developed to automatically learn a new pattern from a given sensor data. The methods and apparatuses support both real-time processing as well as post-processing the pre-recorded sensor data. The embodiments take as input a time-series (or, spatial series, or both) of sensor data. The embodiments process the sensor data and outputs a new model for the pattern contained in the sensor data. If a pattern can not be identified then the system outputs "unable to learn a new pattern."

In some embodiments, a cyclic pattern is modeled using n oscillators, with primary frequencies $\omega_1, \omega_2, \ldots, \omega_n$. The state space is the n-Torus, denoted as $\mathbb{T}^n = [0, 2\pi]^n$, where n is an integer. The state at time t is denoted as $$\theta_t = (\theta_t^1, \theta_t^2, \ldots, \theta_t^n).$$

The state represents the particular phases of the n oscillators at time t.

Furthermore, at time t, the sensor measurement value is denoted as $Y_t \in \mathbb{R}^M$, where M is the number of distinct sensors. The observation process is defined as $Z_t = \int_0^t Y_s ds$ and $\mathcal{Z}_t := \sigma(Z_s : s \leq t)$ denotes the sigma-algebra of observations up to and including time t. The observation process $Z_t$ is useful in the construction and the analysis of the model, $Z_t$ signifies information contained in the history of observations made until time t, and the sensor value $$Y_t \doteq \frac{dZ_t}{dt},$$

interpreted in the formal sense, is the time-derivative of the observation process. Thus, the sensor data is a plurality of sequential sensor measurements associated with an activity.

In some embodiments, a model structure is provided for the two stochastic processes: first, the evolution of the continuous-valued state $\theta_t$ is described by a stochastic differential equation model, $$d\theta_t = \Omega dt + dB_t, \bmod 2\pi, \tag{1}$$

where $\Omega = \mathrm{diag}(\omega_1, \omega_2, \ldots, \omega_n)$ is a diagonal matrix of primary frequencies and $B_t$ is a Wiener process with covariance $\Sigma_B = \mathrm{diag}(\sigma_B^2(1), \sigma_B^2(2), \ldots, \sigma_B^2(n))$. The SDE (1) is referred to as an oscillator model. The relationship in (1) can be interpreted to mean, in a simplified sense, that the phases are incrementally changed based on the frequencies and a time increment, as well as by a noise process. That is, the phases evolve over time according to the relationship in (1).

Secondly, the phases of the system are not generally available for measurement. In some embodiments, the frequencies and their phases may be associated with complex mechanical movements of a system that are not visible, or simply not practical to measure directly. Thus, the actual physical sensors, or software sensors, provide sensor measurements that are functions of the underlying system, and are modeled according to the stochastic differential equation model, $$dZ_t = h(\theta_t)dt + dW_t \quad (2)$$

where $h(\theta) = (h^1(\theta), h^2(\theta), \ldots, h^M(\theta))$, interpreted as a column vector, is the vector-valued observation function on the state space $\mathbb{T}^n$ and $W_t$ is a Wiener process with covariance $\Sigma_W = \text{diag}(\sigma_W^2(1), \sigma_W^2(2), \ldots, \sigma_W^2(M))$. That is, each sensor provides a measurement that is function of the underlying system phases, plus a noise component.

Thus, in some embodiments, a method is provided to determine matrices $\Omega$ and $\Sigma_B$ for the oscillator model as set forth in equation (1). The method operates on a time-series of sensor data to determine the parameters. The method comprises: receiving sensor measurement data associated with an activity. Activities may include physical movements, gestures, by a human and/or machine; determining from the sensor data a reduced set of primary frequency values that characterize an approximation of the sensor data; determining a time sequence of phases for each primary frequency in the set of primary frequencies based on values of the primary frequencies and a time increment; and, storing the time sequence of phases.

In order to identify the oscillator model, a minimal (small) set of frequencies present in the data is identified. These frequencies may be considered to be the primary frequencies present in the data in that they are able to provide an approximation of the sensor activity. Several algorithms are available in the literature to accomplish the primary frequency identification, including time-frequency analysis, least-squares, singular value decomposition and algorithms based on compressed sensing, as briefly described below.

Time frequency analysis. This method involves taking a Gabor transformation of the sensor data and selecting $\omega_1, \omega_2, \ldots, \omega_n$ as the n frequencies whose energy is the largest, such that no two frequencies in the list are integral multiple of each other. If that is the case then only the lowest frequency is retained. Example: Suppose one takes a Gabor transform and identifies $\{1, 2, \sqrt{2}\}$ as frequencies with largest energy sorted in that order. Since 2 is integral multiple of 1, it is discarded and one lists $\{1, \sqrt{2}\}$ as the frequencies with the maximum energy.

Singular value decomposition (SVD). In this method, the frequencies are determined by building a linear predictor [D. Tufts and R. Kumaresan (1982). Procs. of IEEE 70(9):975-988]. The block of time series data is used to assemble a Hankel matrix whose SVD is used to obtain the coefficients of the optimal linear predictor. Once a subset of frequencies has been identified (from the poles of the predictor), the top n frequencies are picked as poles with least damping, such that no two frequencies in the list are integral multiple of each other.

Least square or compressed sensing. In this method, one constructs a solution to the problem of the form: $y = Ax + b$. Here y is the vector of sensor measurement, A is the matrix constructed from the Fourier basis, b is noise and x are the unknown Fourier coefficients. These are determined either as a least square solution ($\min\|x\|_2$) or as a sparse solution ($\min\|x\|_0$ or its convex relaxation $\min\|x\|_1$) [Y. Chi et. al. (2011). IEEE Trans. Signal Processing 59(5):2182-2195].

Once the coefficients have been determined, the frequencies can be obtained. For the sparse solution case, these are frequencies corresponding to the non-zero coefficients. For the least square solution, a threshold may be used. As before, only the fundamental frequency is retained. Its integral multiples are discarded.

Once the minimal set of frequencies have been identified, only the fundamental, or primary, frequencies are retained and labeled as $\omega_1, \omega_2, \ldots, \omega_n$.

In further embodiments, the method may include determining the observation function h and matrix $\Sigma_W$ for the observation model given in equation (2). In order to identify the sensor model (2), a set of basis functions $\{\phi(\theta;s)\}_{s=1}^S$ is selected to parameterize the function h, $$h(\theta) = \Sigma_{s=1}^S \alpha(s)\phi(\theta;s). \quad (3)$$

A particular example of basis functions are the Fourier modes on $\mathbb{T}^n$. Other basis sets may include wavelet functions such as the Haar wavelet, Legendre wavelet, and Bezier functions.

The coefficient vector $\alpha(s) \in \mathbb{R}^M$, for $s=1, 2, \ldots, S$, must be deduced. For this parameterized class of model, the method includes learning the unknown parameters $\{\alpha(s)\}_{s=1}^S$. To learn these coefficients, the following stochastic differential equation is implemented, $$d\alpha_t(s) = \epsilon_t \hat{\phi}_t(s)(dZ_t - \hat{h}_t dt),$$

$$\epsilon_t = \frac{1}{1 + t/\tau}\epsilon_0,$$

where $\tau \in \mathbb{R}$ is used to set the decay rate of the coefficient (that is, each basis coefficient is updated with a weighting factor that decreases in magnitude over time, or alternatively, the decay term may be eliminated in favor of a small constant $\epsilon_0$), and $\hat{h}_t := E[h(\theta_t)|Z_t]$ (the expected value of the observation function given the observation history) and $\hat{\phi}_t(s) := E[\phi(\theta_t;s)|Z_t]$ (the expected value of the given basis function given the observation history). Thus, in some embodiments, the observation function is updated based on updating coefficients of a set of basis functions. As shown, the updates may be based on a difference between an expected value of the observation function and at least one of the plurality of sequential sensor measurements. The basis vector coefficient may also be updated based on a magnitude of the expected value of a corresponding basis vector.

Figure 6A:
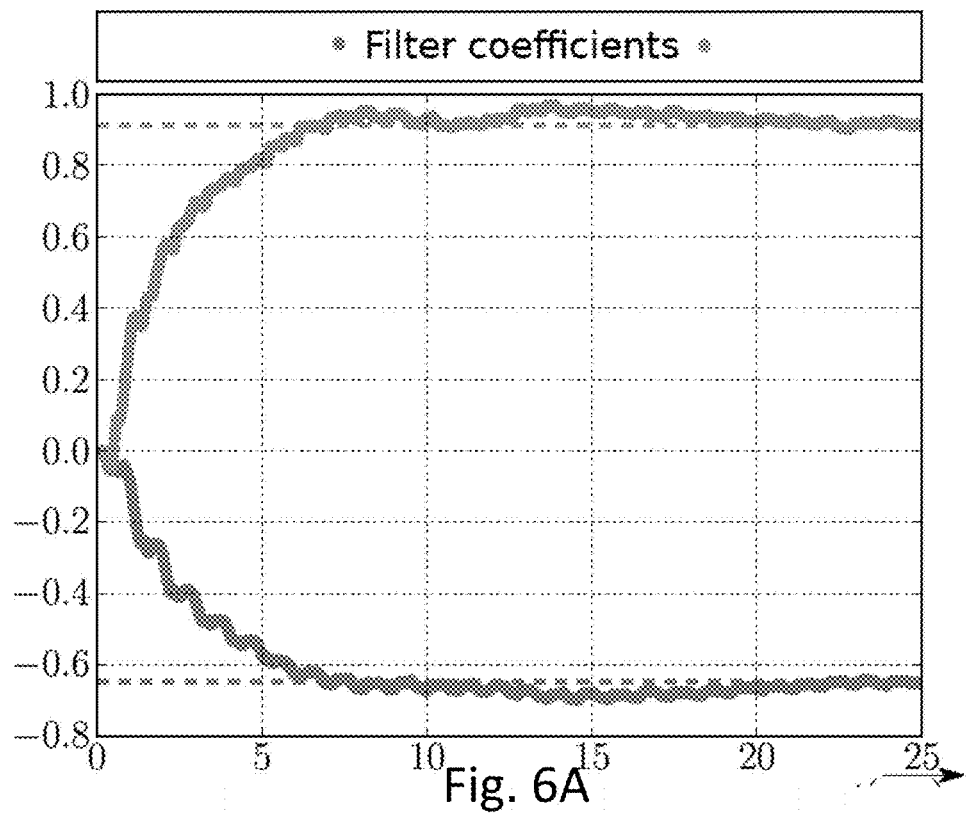
FIG. 6A depicts convergence of some system parameters.

With respect to FIG. 6A the convergence of basis function coefficients is shown as a user performs bicep curls. The system is able to learn these model parameter values with just 5-10 seconds of sensor data (about 5-10 curls).

To obtain the values used to update the coefficients, a number of difference embodiments may be used, including a particle filter, a Feedback Particle Filter (FPF), a Kalman filter (KF) and an Extended Kalman Filter (EKF). Thus, the observation prediction may based on an average of the observation function operating on a plurality of activity phase particles as determined by an FPF, or the observation prediction is based on observation function evaluated at the phase estimate provided by an extended Kalman filter.

In some embodiments a nonlinear filter may be desirable, such as either the feed-back particle filter (FPF) or the extended Kalman filter (EKF) to approximate the posterior distribution of $\theta_t$ given $Z_t$.

In one embodiment an FPF is used to approximate the a posterior distribution by using particles $\{\theta_t^i\}_{i=1}^N$. That is, a plurality of particles (perhaps in the range of 200 to 500 such particles) are generated having uniformly distributed values for the phases of each frequency of the system. Then, over time, the dynamics of the $i^{th}$ particle evolve according to, $$d\theta_t^i = \Omega^i dt + dB_t^i + K(\theta^i,t)\cdot(dZ_t - \frac{1}{2}(h(\theta_t^i)+\hat{h})dt),$$
$$i=1,\ldots,N$$

where $\Omega^i$ is sampled from a distribution with mean $\Omega$, $\hat{h}_t = 1/N\Sigma_{i=1}^{N}h(\theta_t^i)$, and K is the gain function that is obtained as a numerical solution of a certain boundary value problem [Yang, Mehta, Meyn. Feedback Particle Filter. IEEE Trans. Automatic Control (2013), and U.S. patent application Ser. No. 13/670,596 entitled "Feedback-Based Particle Filtering", both of which are incorporated herein by reference]. The notation signifies that the stochastic differential equation is interpreted in the Stratonovich sense. This means that the numerical time-discretization algorithm that is used to solve for $\theta_t^i$ is based on the Stratonovich stochastic integral.

Using FPF, the two quantities of interest in step 3 are approximated as follows $$\hat{h}_t = \frac{1}{N}\sum_{i=1}^{N}h(\theta_t^i),\, \hat{\phi}_t(s) = \frac{1}{N}\sum_{i=1}^{N}\phi(\theta_t^i; s)$$

In an EKF-based implementation, the posterior distribution is approximated at each time as a Gaussian with mean $\hat{\theta}_t$ and variance $P_t$. These evolve according to EKF equations, $$d\hat{\theta}_t = \Omega dt + K_t(dZ_t - \hat{h}_t dt),$$

$$dP_t = \Sigma_B - K_t Dh(\hat{\theta}_t)P_t,$$

where $K_t = P_t Dh^T(\hat{\theta}_t)\Sigma_W^{-1}$, where $Dh(\hat{\theta}_t)$ is the Jacobian matrix evaluated at $\hat{\theta}_t$; the superscript $T$ denotes the matrix-transpose operation. The Jacobian matrix is computed by taking the derivative of h with respect to its argument. The $mn^{th}$ entry of Dh is given by $$\frac{\partial h^m}{\partial \theta_n}(\theta).$$

Using EKF, the two quantities of interest are approximated as follows:

$$\hat{h}_t = (\hat{\theta}_t), \hat{\phi}_t(s) = \phi(\hat{\theta}_t;s).$$

The variance $\Sigma_W$ is estimated empirically as a sample variance of the prediction error, obtained as the difference between the sensor measurement and its prediction by the filter. The sample variance at time t is denoted as $\Sigma_{W,t}$.

A termination criterion may be implemented based on convergence of the coefficient vector $\alpha_t(s)$; FIG. 6A depicts convergence of basis function coefficients. The models are defined according to the converged (final) values of the coefficients. Suppose T is the final time then $$h(\theta) = \sum_{s=1}^{S}\alpha_T(s)\phi(\theta; s)$$

and $\Sigma_W = \Sigma_{W,T}$.

If the coefficients do not converge, either additional sensor data is needed or additional basis functions are needed in defining the parameterized model (3) for h. In this case, the system may be configured to output a message indicating that there was no converged model and may display a message such as "unable to learn a new pattern" on a graphical user interface.

Note that once the frequencies are identified, the algorithms for learning the observation model may be implemented in an online real-time fashion with streaming sensor data. In practical applications of the system, 6-10 cycles are typically sufficient to learn these models.

Thus, in one embodiment of a method 500 depicted in FIG. 5A, a method of determining an activity detection filter is provided, the method comprising: receiving sensor data (502) comprising a plurality of sequential sensor measurements associated with an activity; determining a set of activity frequencies (504) associated with the sensor data; and iteratively calculating: (i) a prediction error (506) based on a difference between at least one of the plurality of sequential sensor measurements and an observation prediction $\hat{h}_t$ from an observation model, the observation model operating on phases in a set of phases associated with the set of activity frequencies; (ii) an updated set of estimated activity phases (508) based on the prediction error and the set of activity frequencies; (iii) an updated observation function of the observation model (510) based on the prediction error; determining a convergence of the observation function; and, storing the set of activity frequencies and the updated observation function (512).

The method 500 may include determining the set of activity frequencies using one of time-frequency analysis, least-squares algorithm, singular value decomposition, and compressed sensing algorithm.

In some embodiments, the observation function is represented as a set of coefficients and corresponding basis functions of phases of the activity frequencies. Often one (or two) harmonics of the frequencies are sufficient, such as $\cos(\theta)$, $\sin(\theta)$, $\cos(2\theta)$, and $\sin(2\theta)$, for the basis functions. In this example the basis functions of phases are sine functions and cosine functions of the phases of the activity frequencies. As described above, calculating an updated set of estimated activity phases may be performed using a particle filter algorithm, in which case the set of estimated activity phases is based on a plurality of particle phase vectors. The plurality of particle phase vectors is then used to determine an observation prediction. The prediction error may be a particle-specific prediction error, and in which case is also based on a particle-specific observation prediction $h(\theta_t^i)$. The particle-specific prediction error is based on a difference between at least one of the plurality of sequential observation measurements and an average of (i) an observation prediction and (ii) the particle-specific observation prediction.

In further embodiments, calculating an updated set of estimated activity phases is performed using an extended Kalman filter algorithm, and the observation prediction is based on an extended Kalman filter. In alternative embodiments using the FPF, the observation prediction is based on an average of the observation function operating on a plurality of activity phase particles (i.e., particle phase vectors). Similarly, some embodiments may use an FPF to determine the expected value of a corresponding basis vector by determining an average of the corresponding basis vector for a plurality of activity phase particles, while others might use an EKF.

With reference to FIG. 1, an embodiment of an apparatus may comprise a tangible computer-readable medium having instructions stored thereon that when executed cause a processor to: receive sensor data comprising a plurality of sequential sensor measurements associated with an activity;

determine a set of activity frequencies associated with the sensor data; iteratively calculate: (i) an prediction error based on a difference between at least one of the plurality of sequential sensor measurements and an observation prediction, the observation function operating on phases in a set of phases associated with the set of activity frequencies; (ii) an updated set of estimated activity phases based on the prediction error and the set of activity frequencies; (iii) an updated observation function based on the prediction error; determine a convergence of the observation function; and, store the set of activity frequencies and the observation function.

Algorithms for recognition and classification of cyclic patterns will now be described. The methods and devices support both real-time processing as well as post-processing the pre-recorded sensor data. In one embodiment, the method processes the sensor data and outputs, at each time, the label for the activity as well as real-time analytics concerning the cyclic pattern, e.g., count of the cycles, speed and variation. If the pattern is not recognized then the tool outputs "unknown pattern."

The following notation is adopted: At time t, the hidden activity phase vector is denoted by $\theta_t \in \mathbb{T}^n$. At time t, the Activity random variable is denoted as $A_t$, defined on a discrete state-space $\{1, 2, \ldots, L\} =: \mathbb{S}$. It associates a specific activity model to the state process: $[A_t=l]$ signifies that the dynamic evolution at time t is described by the $l^{th}$ model. Also at time t, the observation process is denoted by $Z_t \in \mathbb{R}^M$. The observation history is denoted as $\mathcal{Z}_t := \sigma(Z_s : s \leq t)$, and the sensor measurement value $$Y_t \doteq \frac{dZ_t}{dt},$$

interpreted in the formal sense.

The following models are assumed available for the three stochastic processes: the evolution of the continuous-valued state $\theta_t$ is described by a stochastic differential equation with discrete-valued coefficients:

$$d\theta_t = \Omega(A_t)dt + dB_t, \mod 2\pi \quad (5)$$

where $B_t$ is a Wiener process with covariance $\Sigma_B = \Sigma_B(A_t)$—the notation is used to signify dependence upon the mode $A_t$.

The discrete-valued state (mode) $A_t$ evolves as a Markov chain in continuous-time:

$$P(A_{t+\delta}=l|A_t=m) = q_{ml}\delta + o(\delta), m \neq l. \quad (6)$$

The generator for this jump process is denoted by a stochastic matrix Q whose $ml^{th}$ entry is $q_{ml}$ for $m \neq l$.

At time t, the observation model is given by, $$dZ_t = h(\theta_t; A_t)dt + dW_t, \quad (7)$$

where $W_t$ is a Wiener process assumed to be independent of $B_t$. Note that the observation function is vector valued, $h(\theta; l) = (h^1(\theta; l), h^2(\theta; l), \ldots, h^M(\theta; l))$, interpreted as a column vector. The measurement noise covariance is denoted as $\Sigma_W = \Sigma_W(A_t)$—the notation is used to signify dependence upon the mode $A_t$.

The parameters for the models for the L patterns are assumed to be known—these may be obtained by using the Activity Filter for Training, as described above.

In one embodiment, given a time-series of sensor measurements till time t, Activity Detector Filters are used to obtain an estimate of the Activity Probability at time t. This is represented as a $\mathbb{R}^{L+1}$ probability vector $\mu_t = [\mu_t^0, \mu_t^1, \ldots, \mu_t^L]$, where $\mu_t^l = \text{Prob}([A_t=l]|\mathcal{Z}_t)$ for $l=1, \ldots, L$, and $\mu_t^0$ denotes the probability that none of the L activities is currently active.

For each activity that is active (i.e., $\mu_t^l > 0$), the method may obtain an estimate of the phase $\theta_t$ for the activity. This estimate is obtained in terms of the posterior distribution $p^*(\theta, t)$ where $$\text{Prob}(\theta_t \in B | \mathcal{Z}_t) = \int_B p^*(\theta, t) d\theta$$

for each measurable set $B \subset \mathbb{T}^n$.

The first part, estimation of the Activity Probability, is referred to as classification. It is used to classify the activity that is most likely to be active at time t. The second part is needed to obtain real-time analytics concerning the hidden activity.

The two estimates are obtained using the two filters as described next. The Activity Detector filter is used to estimate the Activity Probability $\mu_t$ as follows, $$d\mu_t = Q^T \mu_t dt + \sum_{m=1}^{M} \frac{1}{\sigma_W^2(m)} (\hat{H}_t^m - \hat{h}_t^m I) \mu_t (dZ_t^m - \hat{h}_t^m dt), \quad (8)$$

where I is an L+1-dimensional identity matrix, $\hat{H}_t^m = \text{diag}\{0, \hat{h}_t^m(1), \hat{h}_t^m(2), \ldots, \hat{h}_t^m(L)\}$, $\hat{h}_t^m = \Sigma \mu_t^l \hat{h}_t^m(l)$ and $\hat{h}_t^m(l) := E[h^m(\theta_t; l)|\mathcal{Z}_t]$ for $m=1, 2, \ldots, M$ and for $l=1, 2, \ldots, L$. $Q^T$ represents the HMM transition probabilities. In some embodiments the values of the transition probabilities may be set to a small value to provide an erosion of any given activity probability while that activity is in fact active, thus preventing the system from setting the given probability too high, which may introduce a delay in detecting a new activity. In other embodiments, the elements of $Q^T$ may be set to zero thus disregarding that term altogether.

The conditional expectation is estimated by using the Activity Filter, either the feedback particle filter (FPF) or the extended Kalman filter (EKF), as described above. An estimate of the activity is obtained by running L parallel Activity Filters (106A-M) to approximate the posterior distribution of $\theta_t$ given $\mathcal{Z}_t$. The $l^{th}$ filter provides an estimate of the $l^{th}$ activity. It is implemented using either an FPF or an EKF algorithm.

FPF: In a FPF-based implementation, the posterior distribution is approximated by using particles $\{\theta_t^{i,l}\}_{i=1}^{N}$ for $l=1, \ldots, L$. For the $l^{th}$-Activity Filter, the dynamics of the $i^{th}$ particle evolve according to the stochastic differential equation, $$d\theta_t^{i,l} = \Omega^{i,l}dt + dB_t^{i,l} + K(\theta_t^{i,l}, t) \cdot (dZ_t - \frac{1}{2}(h(\theta_t^{i,l}; l) + \hat{h}_t(l))dt),$$
$$i=1, \ldots, N$$

where $\Omega^{i,l}$ is sampled from a distribution with mean $\Omega(l)$, $\hat{h}_t(l) = 1/N \sum_{i=1}^{N} h(\theta_t^{i,l}; l)$ and K is the gain function that is obtained as a numerical solution of a boundary value problem [Yang, Mehta, Meyn. Feedback Particle Filter. IEEE Trans. Automatic Control (2013), and U.S. patent application Ser. No. 13/670,596 entitled "Feedback-Based Particle Filtering", both of which are incorporated herein by reference]. The notation signifies that the stochastic differential equation is interpreted in the Stratonovich sense. This means that the numerical time-discretization algorithm that is used to solve for $\theta_t^{i,l}$ is based on the Stratonovich stochastic integral.

EKF: In an EKF-based implementation, the posterior distribution is approximated at each time as a Gaussian with mean $\hat{\theta}_t^l$ and variance $P_t^l$. For the $l^{th}$-Activity Filter, these evolve according to EKF equations, $$d\hat{\theta}_t^l = \Omega(l)dt + K_t^l(dZ_t - h(\hat{\theta}_t^l;l)dt)$$

$$dP_t^l = \Sigma_B(l) - K_t^l Dh(\hat{\theta}_t^l;l)P_t^l$$

where $K_t^l = P_t^l Dh^T(\hat{\theta}_t^l; l)\Sigma_W^{-1}(l)$, where $Dh(\hat{\theta}_t; l)$ is the Jacobian matrix evaluated at $\hat{\theta}_t^l$; the superscript $T$ denotes the matrix-transpose operation. For the $l^{th}$ filter, the $mn^{th}$ entry of Dh is given by $$\frac{\partial h^m}{\partial \theta_n}(\theta;l).$$

The FPF implementation will typically provide for better accuracy and robustness at greater computational cost. The EKF implementation is computationally attractive and may be sufficient, particularly where the pattern is not complex. For a given set of patterns, one may chose to combine EKF and FPF algorithms according to performance criterion and system constraints.

Figure 6B:
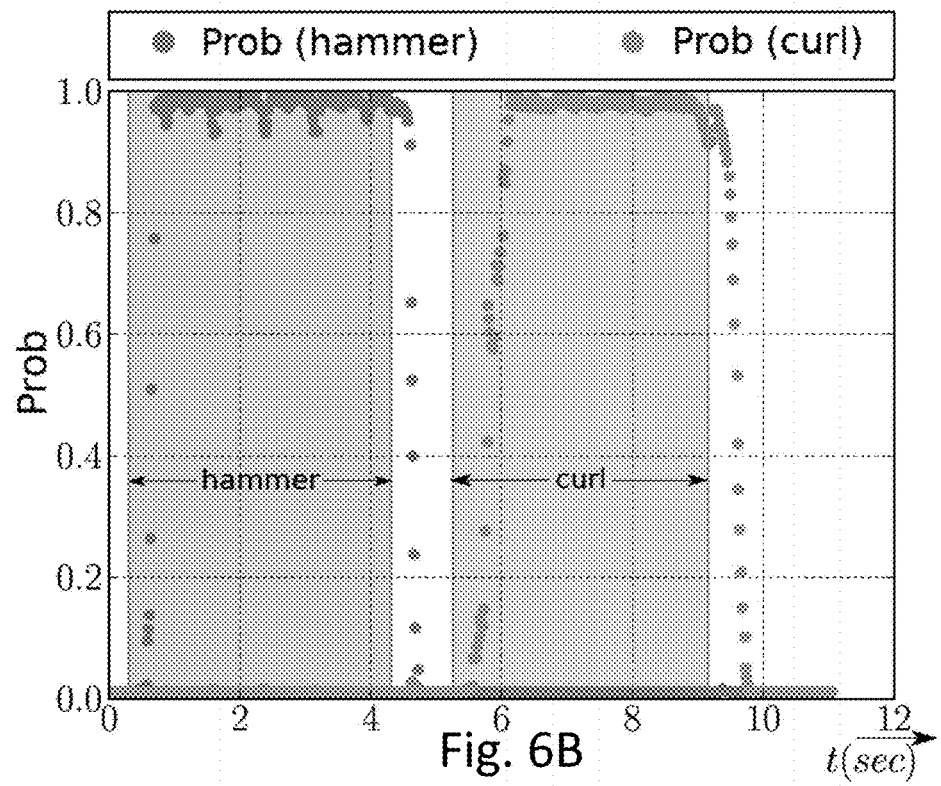
FIG. 6B depicts an example of gesture-detection outputs.
Figure 6C:
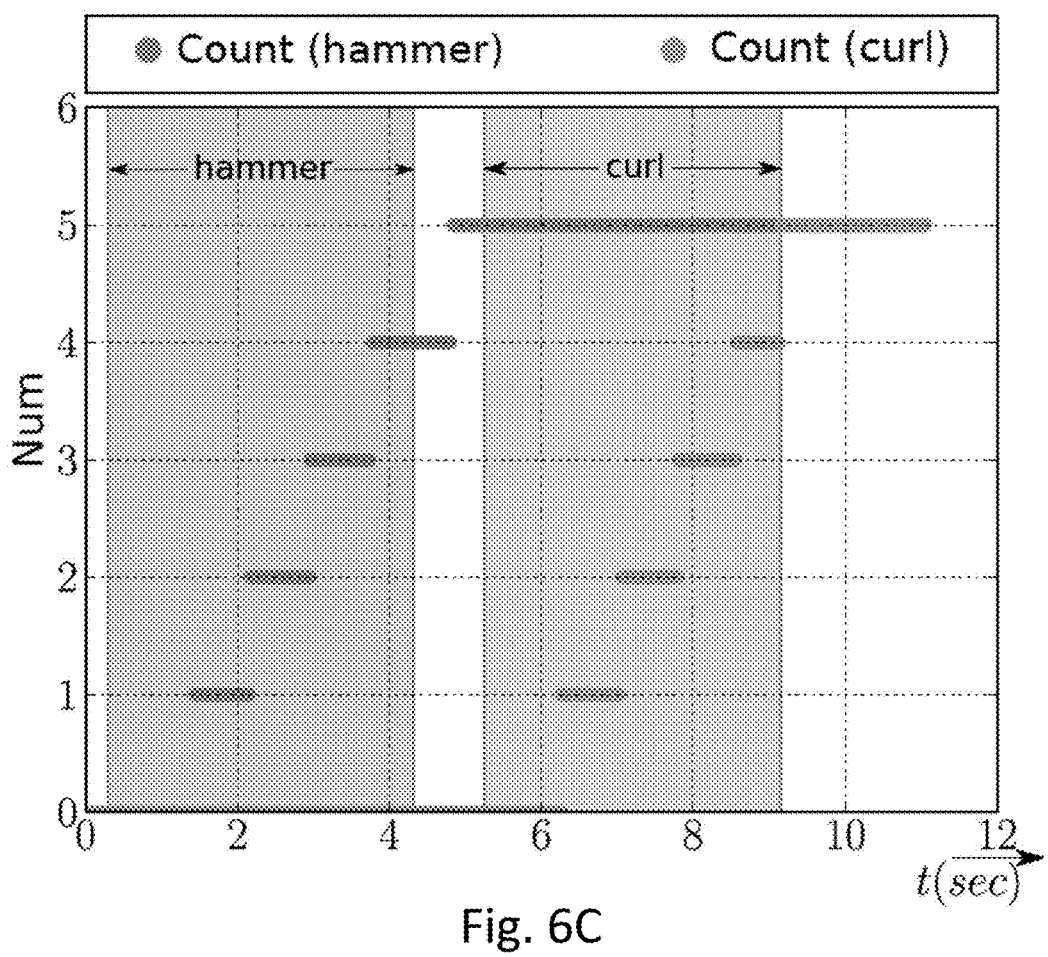
FIG. 6C depicts a plot of gesture counts in accordance with some embodiments.

FIG. 6B shows activity recognition with learned models by plotting the classification probability as a user performs 5 bicep curls and 5 hammer curls. FIG. 6C shows Activity count for these activities.

In some case, it may be of interest to integrate learning within recognition. This may be used to continually improve an activity model as new sensor data becomes available. The algorithms described above are easily adapted to handle this case.

One assumed a parameterized form of the function h as follows:

$$h(\theta, l) = \sum_{s=1}^{S} \alpha(s, l)\phi(\theta; s)$$

The coefficient vector $\alpha(s,l) \in \mathbb{R}^M$, for $s=1, 2, \ldots, S$, and $l=1, 2, \ldots, L$. For this parametrized class of model, the system may be configured to continually learn the unknown parameters $\{\alpha(s,l)\}_{s=1}^S$. For this purpose, the following stochastic differential equation is used, $$d\alpha_t(s,l) = \epsilon\hat{\phi}_t^l(s)(dZ_t - \hat{h}_t(l)dt)$$

where $\epsilon$ is taken to be small and positive, and $\hat{h}_t(l)$, $\hat{\phi}_t^l(s)$ are approximated by using the activity filter, e.g., using the FPF algorithm, $$\hat{h}_t(l) = \frac{1}{N}\sum_{i=1}^{N} h(\theta_t^{i,l}; l), \quad \hat{\phi}_t^l(s) = \frac{1}{N}\sum_{i=1}^{N} \phi(\theta_t^{i,l}; s).$$

With reference to FIG. 5B, a method 501 will be described, the method comprising: receiving sensor data (514) comprising a plurality of sequential sensor measurements associated with one or more unknown activities; obtaining a plurality of activity filter parameters (516) for corresponding activity filters; determining a plurality of sets of phases over time (520), each set of phases determined by using the activity filter parameters of the corresponding activity filter; determining an activity probability (522) associated with each activity filter based on the set of phases for the corresponding activity filter; and outputting an indication (524) of the activity probability of at least a highest probability value. The method 501 may use activity filter parameters that comprise, for each activity filter, a set of activity frequencies and a set of observation function coefficients. Determining the activity probability for an activity filter includes, in some embodiments, determining a probability update based on a difference between that activity filter's observation prediction and an aggregate estimate based on a weighted average of all observation predictions. The weightings used in the weighted average of the observation predictions may be the activity probabilities. Furthermore, determining the activity probability for an activity filter may include determining a probability update based on a difference between a sensor measurement and an aggregated estimate of the observation predictions. Again, the weightings used in the weighted average of the observation predictions may be the activity probabilities.

The systems and methods have been demonstrated using an experimental test bed with a motion sensor wearable device. The hardware device includes a 3-axis accelerometer and a 3-axis gyroscope sensor and also provides a USB and Bluetooth connectivity back to a host computer. For experiments, the wearable device was worn by a user on the wrist.

In contrast to the earlier approaches in the prior art, the system and methods described herein successfully learn and track general types of physical activities, movements, and gestures. The approach does not require feature selection, training of models is straightforward and personalized to a user, and the classification and filtering algorithms have attractive accuracy and robustness properties.

Various embodiments of the systems and methods described herein are better with respect to one or more of the following three metrics:

1. Accuracy. In several benchmarking tests carried out in our lab with accelerometer and gyroscope sensors, our software was shown to be nearly 100% accurate in counting repetitions, once a gesture has been correctly identified.

Figure 7:
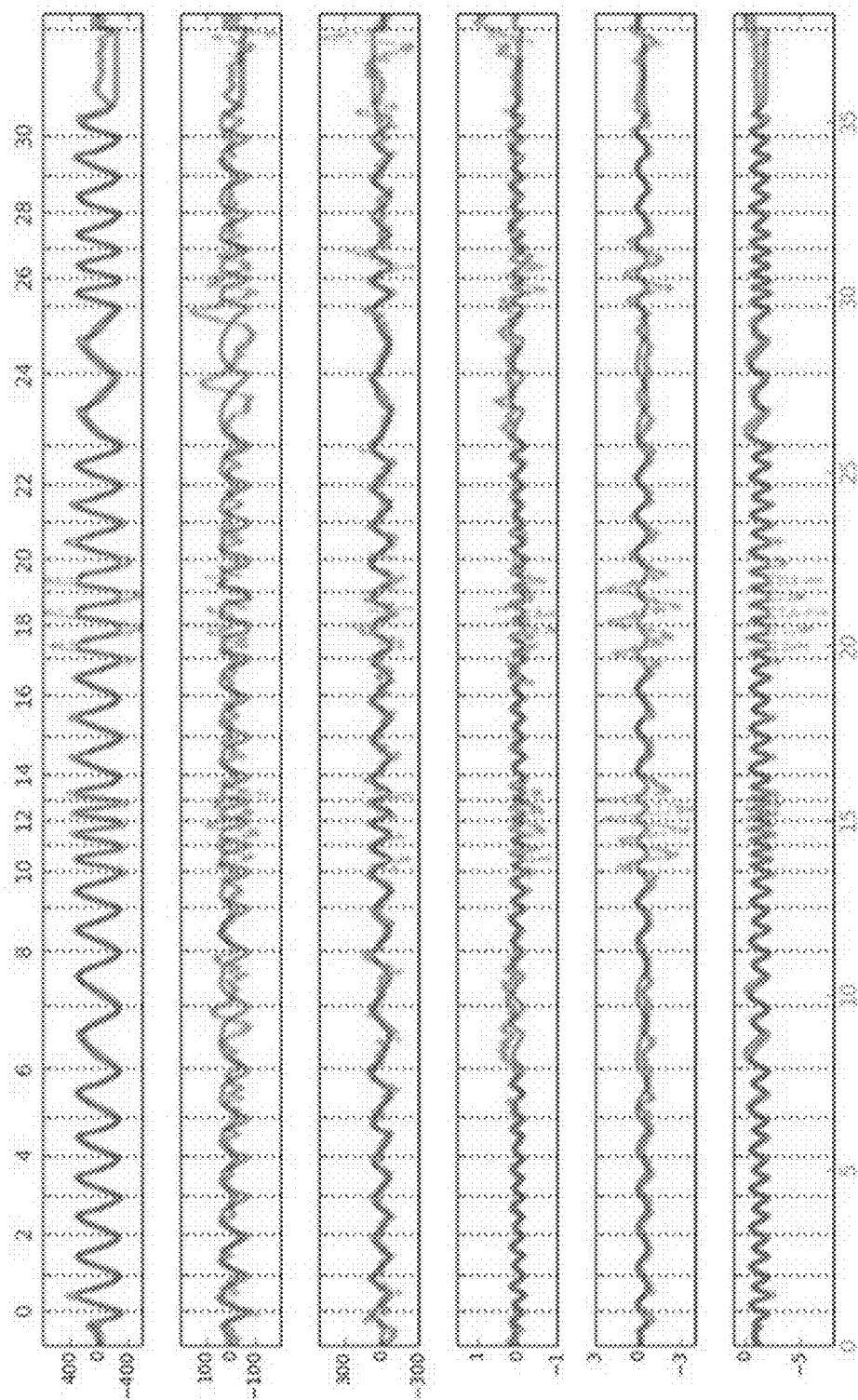
FIG. 7 is a plot comparing measurements from six sensors and their respective observation predictions.

FIG. 7 depicts one such test where the number of steps is being counted as an individual walks with a wrist worn wearable sensor. As shown in FIG. 7, the system is able to accurately count the number of steps even with significant variations in speed and intensity of the walking—these variations are reflected in time and amplitude dilation of the sensor values.

Figure 8:
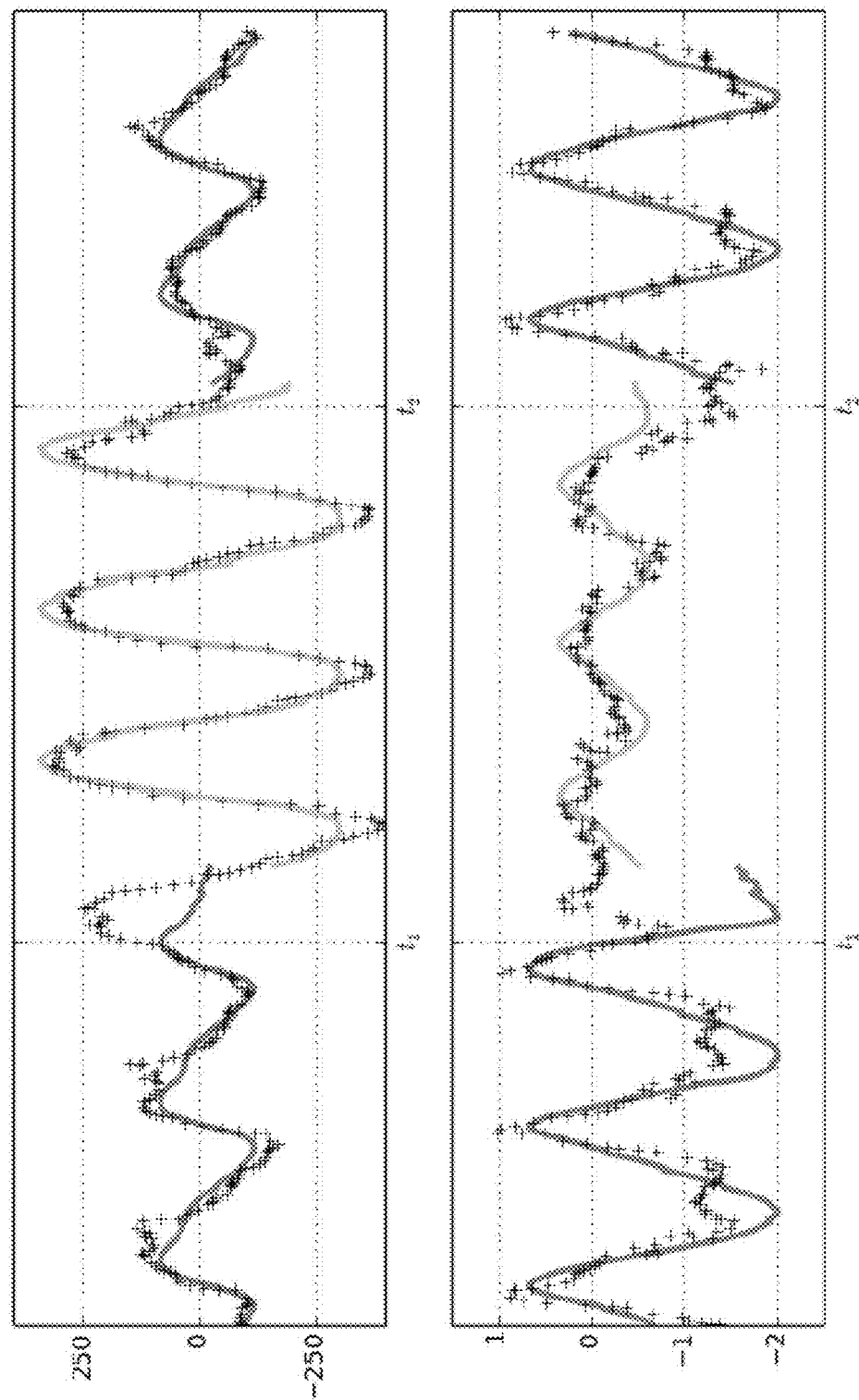
FIG. 8 depicts the system performing a rapid identification of a new gesture.

The time to detect a new gesture is typically on the order of a fraction of a single cycle of the gesture. FIG. 8 depicts one such result where the gesture switches from curl to hammer and then back to curl. The system is able to rapidly identify the change and then adjust its prediction to match the change.

In a benchmarking experiment with a wrist-worn InvenSense sensor, the system counted 934 steps for the 936 walking steps actually taken by the user. The Gear Fit pedometer counted 981 steps. Both the InvenSense device and the Gear Fit were worn by the user on the same wrist.

Figure 9:
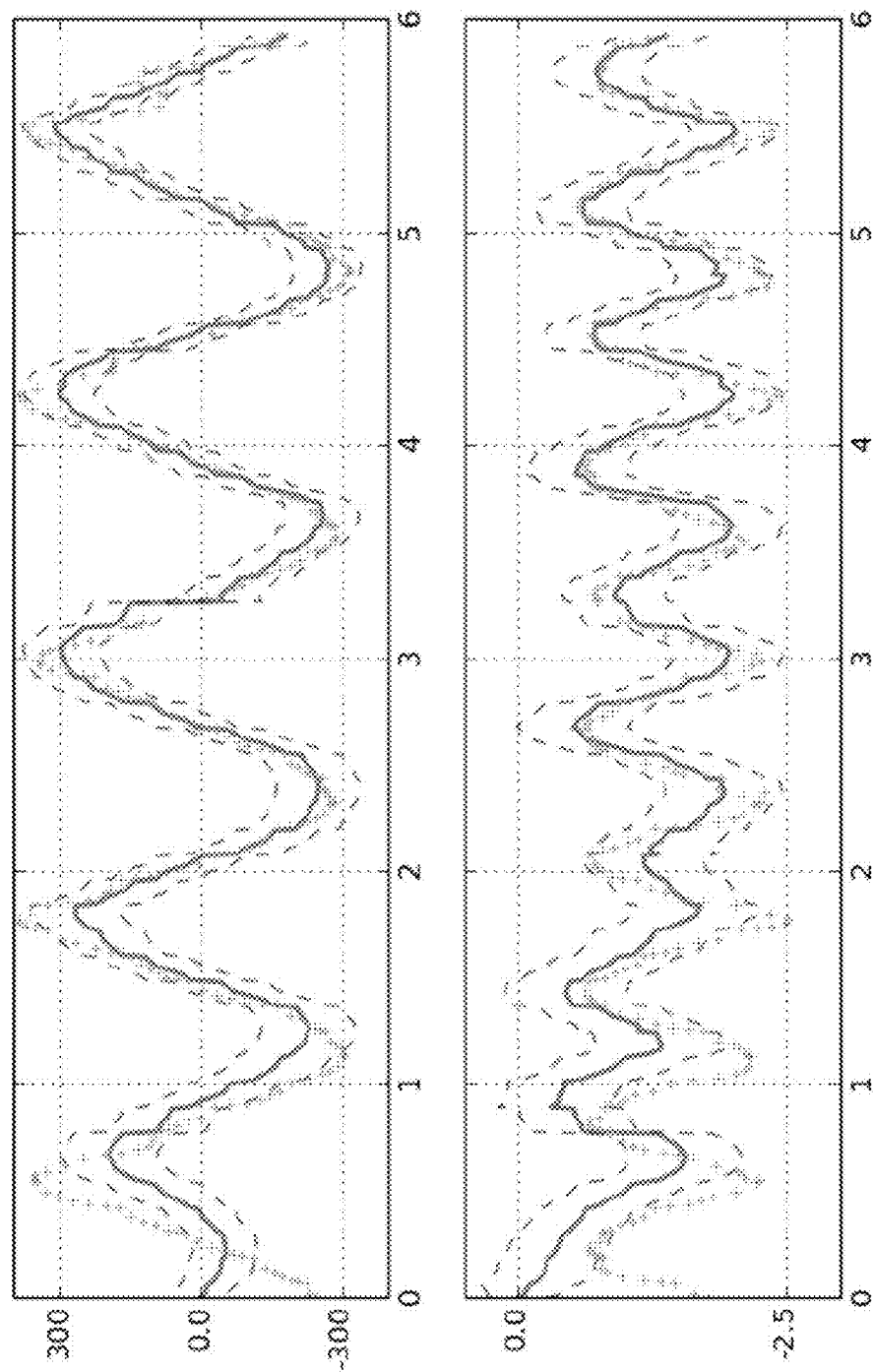
FIG. 9 depicts the observation estimates during a learning period.
Figure 10:
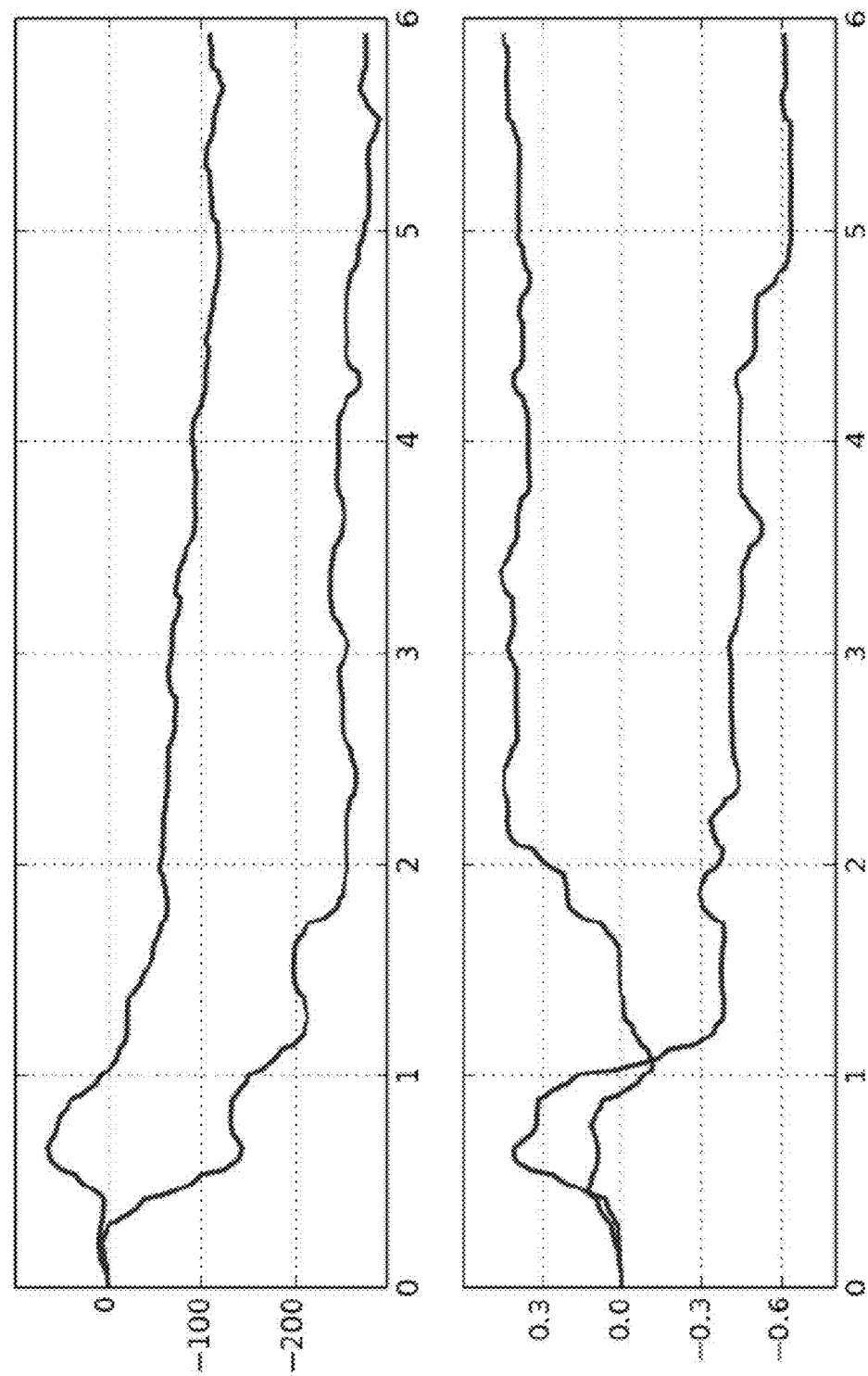
FIG. 10 depicts convergence of observation basis function coefficients.

2. Ease of training. The system can learn a new gesture in as few as 3-4 cycles. FIG. 9 depicts the total time window to learn the walking activity as shown by the convergence of predictions (+) to the sensor data (solid line) is shown in FIG. 9, while convergence of model parameters as the user walks with a wrist worn sensor device is shown in FIG. 10.

3. Open. The system does not require any a priori information regarding the sensor type, e.g., whether the sensor is accelerometer or gyroscope, or regarding where the sensor is worn on the body. The software learns both the sensor model as well as the noise characteristics of the sensor. A sensor with low SNR is automatically discarded.

In the following, experimental results are described that serve to illustrate robustness of the system to various types of real world uncertainties that affect the sensor data. In all these experiments, the activity is walking and the measurements are obtained using a wrist-worn InvenSense motion sensor device. For the sake of simplicity, in some of the plots, only two out of six sensors are depicted—the x-axis accelerometer and the z-axis gyroscope. For the walking activity, these two axes have the highest signal to noise ratio among all three accelerometer and the three gyroscope axes (see FIG. 7). Although the issues and results are described for the walking activity, they are broadly applicable to wide variety of physical activities and gestures.

Figure 11:
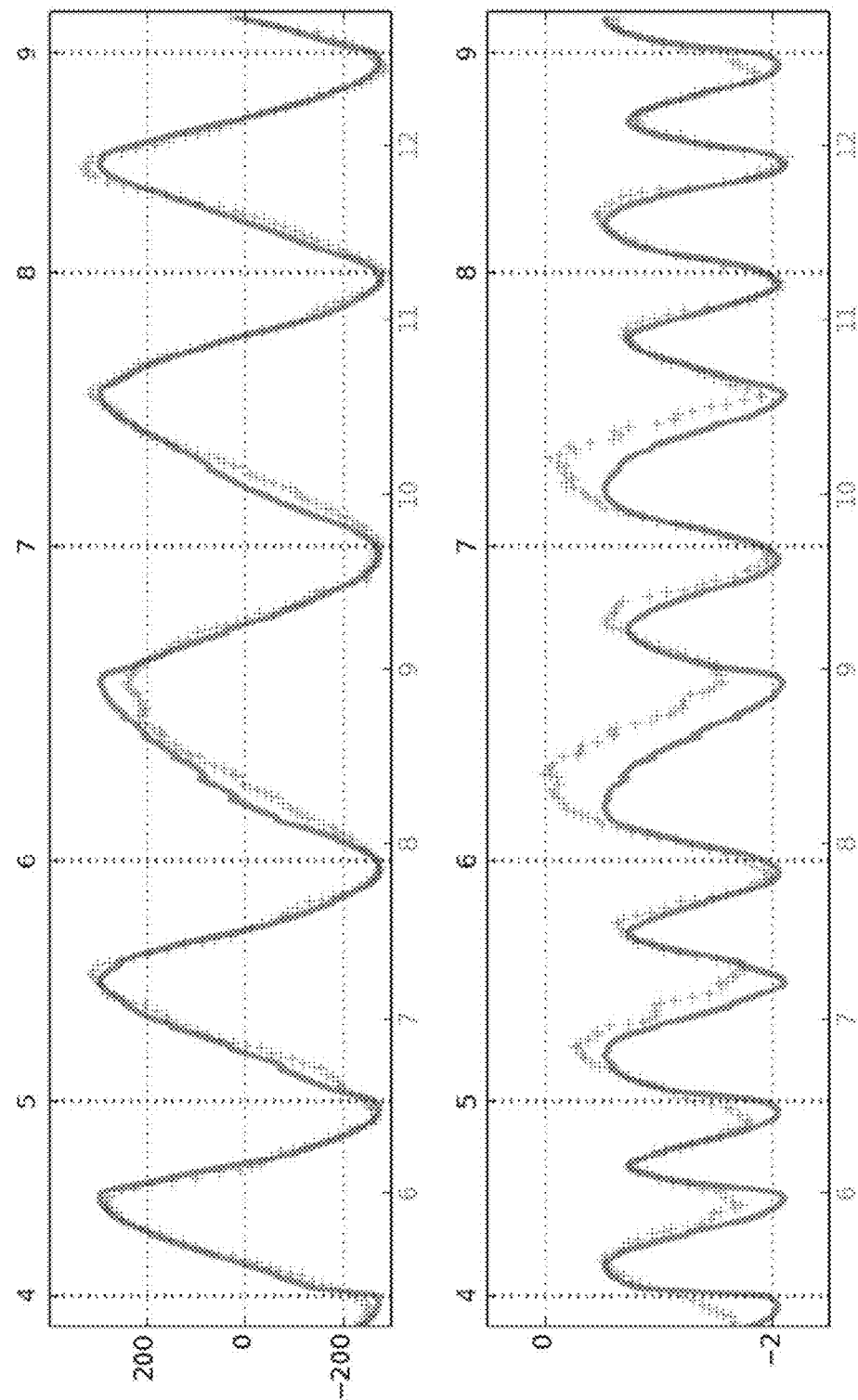
FIG. 11 depicts robustness of the system to variations in gesture speed.

1. Robustness to variations in gesture speed: FIG. 11 illustrates robustness to the real world uncertainty associated with variations in walking speed. These variations are reflected in the non-stationary time dilation of the sensor pattern as the walker slows down or quickens pace. An activity filter detection system that uses incremental updates based on prediction errors is able to automatically compensate for this uncertainty. In the plot, the true sensor values (solid line) are depicted together with the model-based prediction (+) of these values.

Figure 12A:
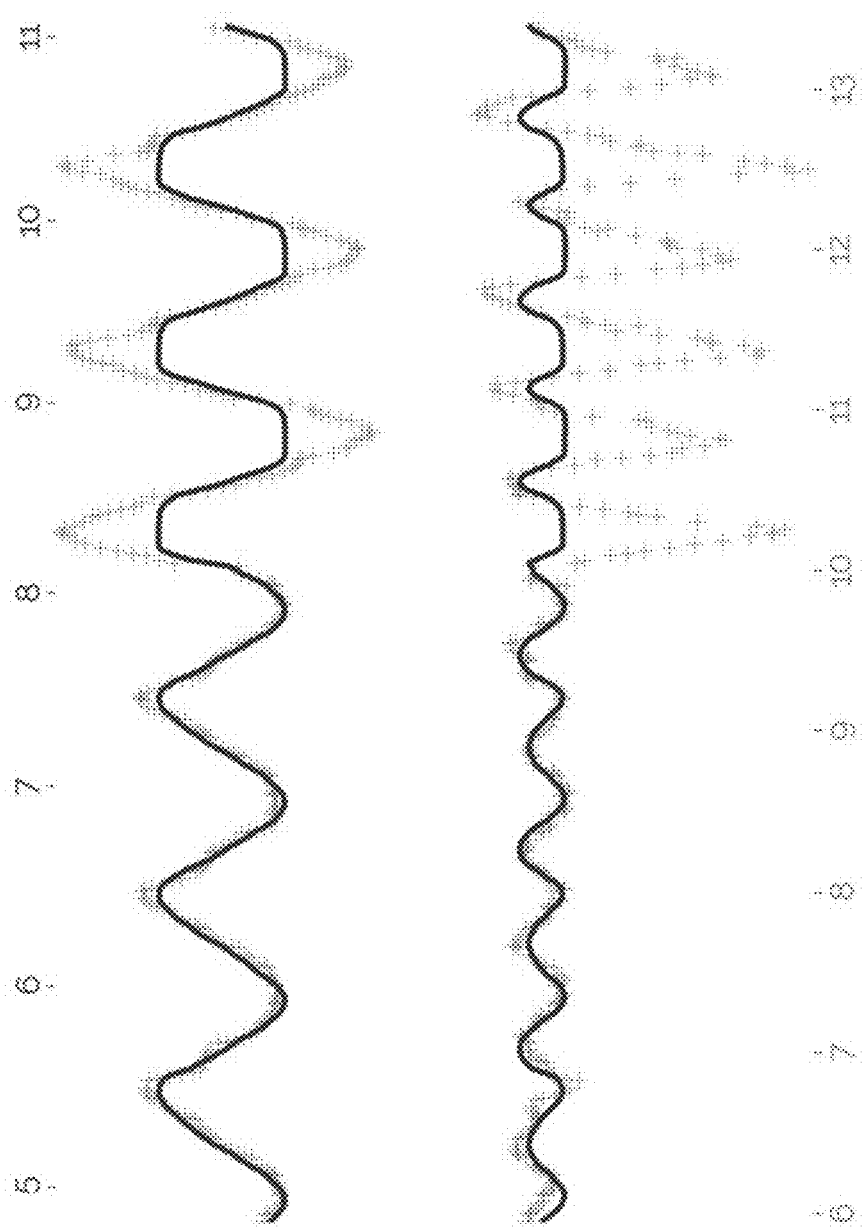
FIG. 12A shows prediction errors for walking and robust walking to a single model.

2. Robustness to variations in gesture intensity: FIG. 12A illustrates robustness to the real world uncertainty associated with changes in the intensity of the arm swing during walking. These variations are reflected in changes in the amplitude of the sensor values as the walker increases the intensity of the arm swing motion. Accurate prediction of the spatial correlation (across sensors) allows one to accurately track the activity.

Figure 12B:
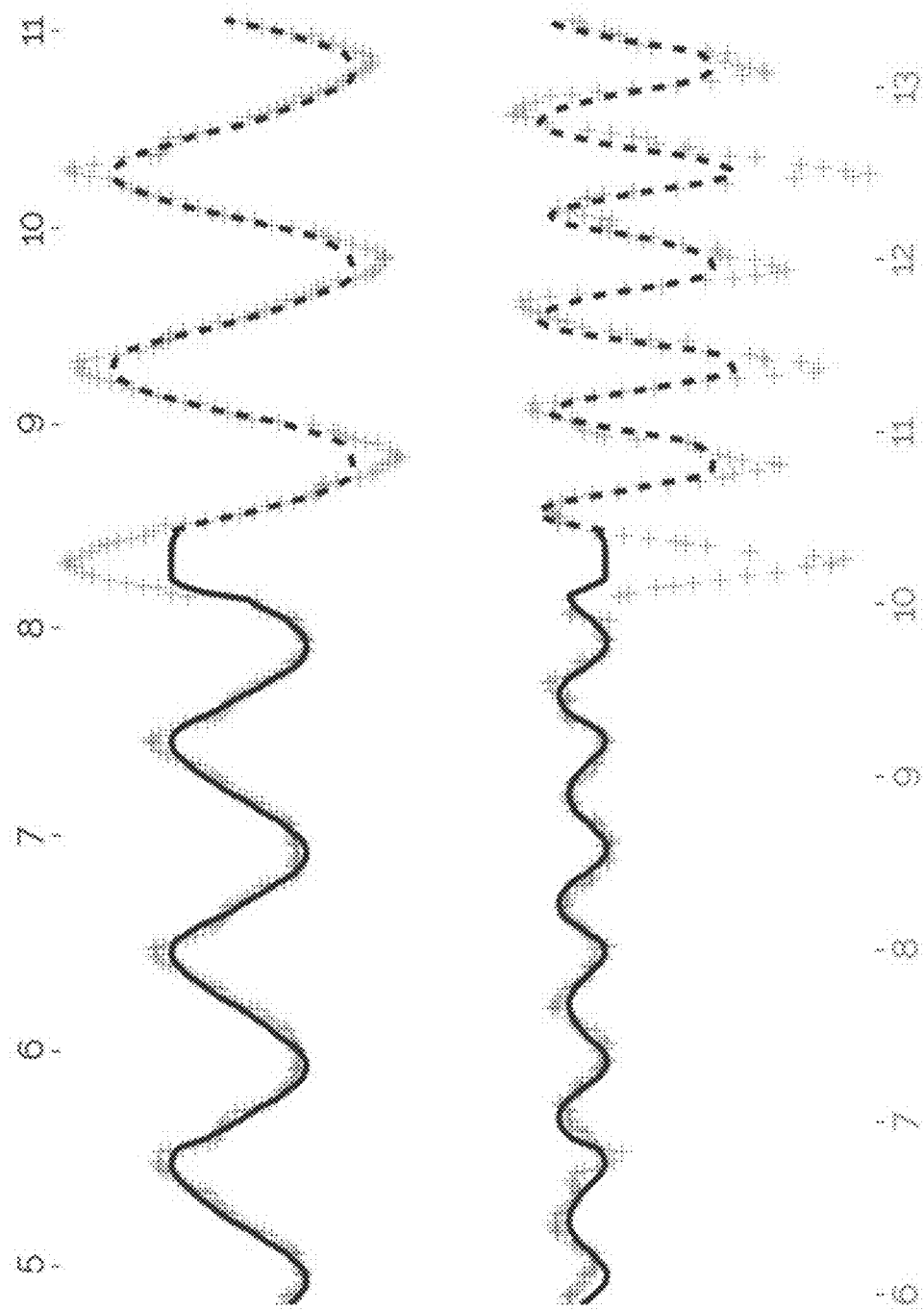
FIG. 12B shows prediction errors when the system utilizes separate "walking" and "intense walking" models.

As illustrated in FIG. 12A, walking and 'intense walking' have similar spatial correlations but different amplitudes of sensor response. Note the prediction error when the intense walking activity begins. With models for both walking and 'intense walking' present during classification, the software is able to accurately distinguish between these activities and provide accurate analysis for the same. This is because during the period of intense walking, the associated model has a smaller prediction error and hence greater likelihood. FIG. 12B depicts the accurate transition from walking to 'intense walking' as the intensity of the arm swing changes.

Figure 13:
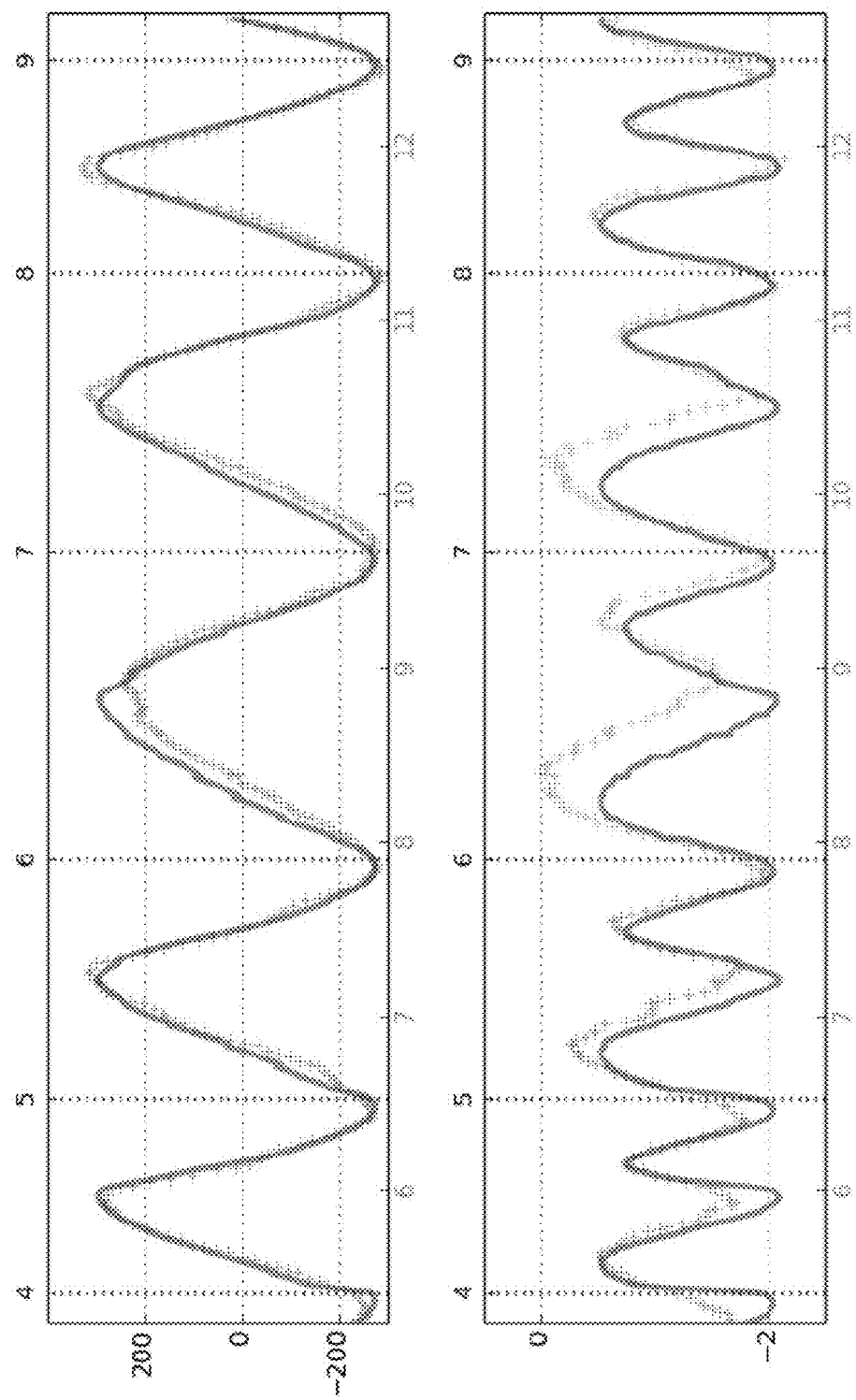
FIG. 13 depicts system performance in the event of a sensor failure.

3. Robustness to (partial) sensor failures: As opposed to a feature-based approach whose performance can degrade rapidly in the presence of sensor failures, a prediction-based approach is naturally robust to sensor failures. FIG. 13 depicts the results of a study where the sensor values from the accelerometer sensor are ignored. Only sensor data from the 3-axes gyroscope is used by the activity detection filter. Even though the accelerometer sensor values are not used, the predictions for these can still be made by using the model. These predictions are depicted in the figure.

Figure 14:
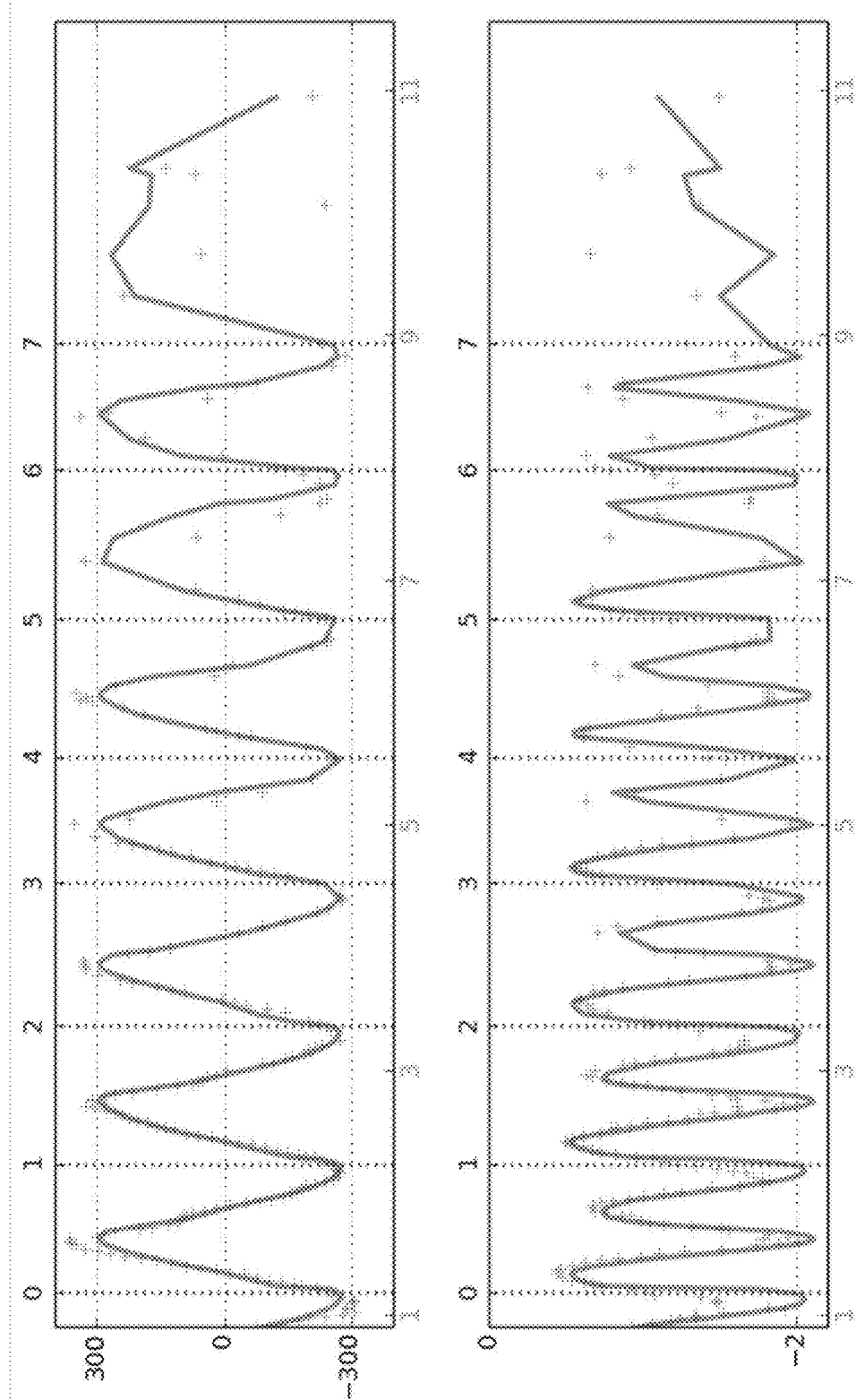
FIG. 14 depicts system performance in the presence of intermittent sensor data loss.

4. Robustness to packet drops: One issue with Bluetooth wireless technology are the packet drops and non-uniform sampling times. FIG. 14 depicts the result of a study where the packets were randomly dropped with a given probability. FIG. 14 shows that the performance and accuracy degrade gently in the face of these packet drops. The filter continues to be accurate even as an average of 3 out of 4 packets are dropped randomly. The filter eventually breaks when 15 out of 16 packets are dropped. This is to be expected given the Bluetooth sampling rate of 50 Hz. With 15 of 16 packets being dropped, one is beyond the Nyquist threshold for the walking activity. The sensor failure is simulated by discarding accelerometer sensor data from time 8 onwards (the discarded measurements are greyed out). Note that even though the sensor values are not available, predictions regarding the same can still be made by using the system. The packet drop is simulated by randomly discarding with a pre-defined probability the sensor measurements (only the processed measurements are depicted).

Figure 15:
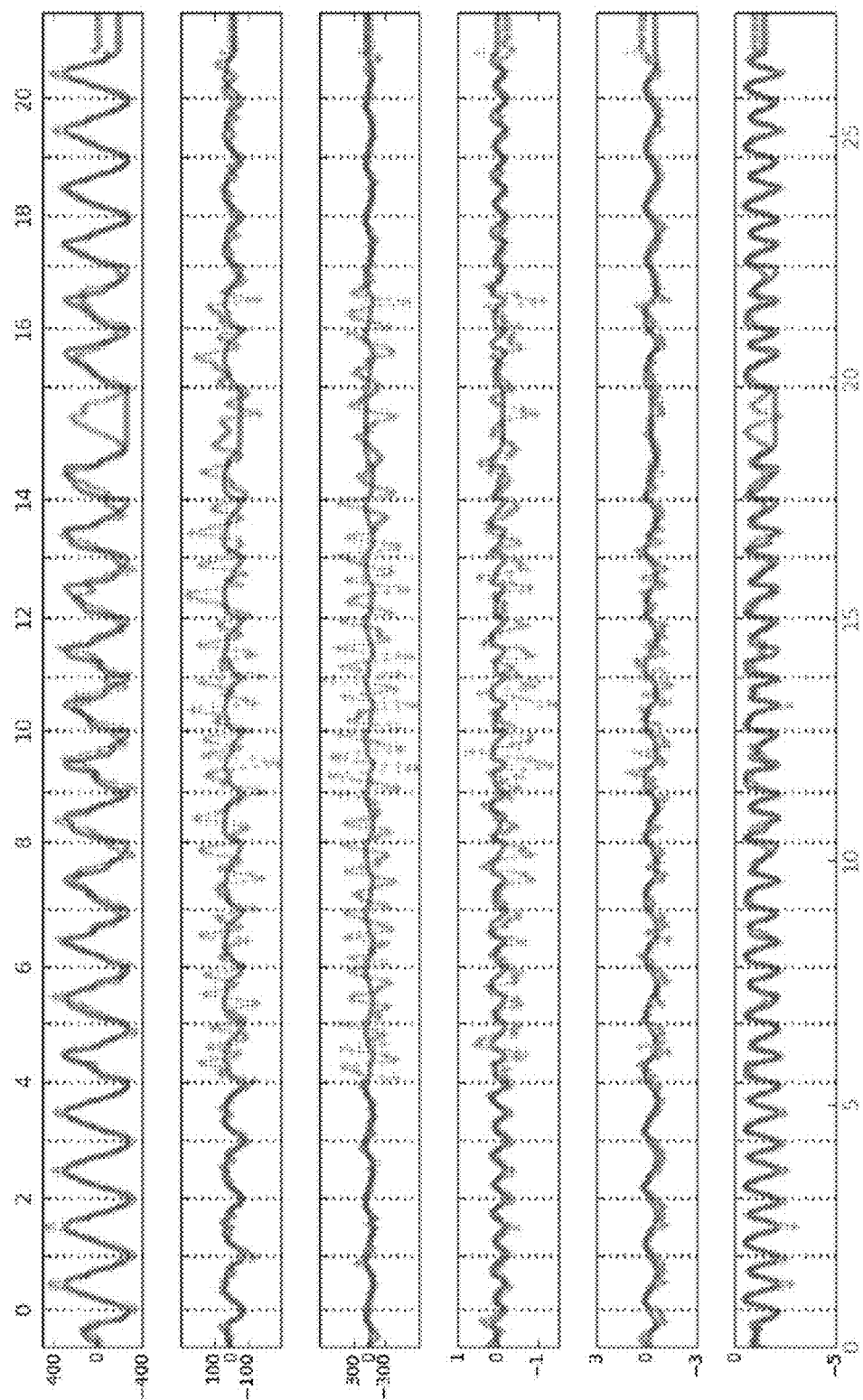
FIG. 15 depicts experimental results of gesture-detection filter training and activity detection.

5. Robustness to sensor noise and vibration: Motion sensors worn by humans can suffer from increased sensor noise/vibration because it is strapped loosely or because of the environmental conditions. FIG. 15 depicts the results of a study where the sensor is exposed to vibrations induced by the user randomly shaking his hands while walking. As a result of these vibrations, the quality of the sensor signal rapidly deteriorates. However, the algorithm is effectively able to 'filter out' the noise to provide a smooth prediction and as a consequence, accurate tracking. As can be seen in the figure, in this experiment, the filter misses only a single step out of the 21 steps taken. The 30 steps are counted with nearly 100% accuracy in the presence of significant variations due to sensor vibration.

At a high level, activity-detection filters may be used for at least the following purposes:

(i) Activity Repetition Counting

Received sensor data is analyzed by one or more activity filters. An activity detector, such as the activity detector 114 of FIG. 1, outputs, for each activity filter, a respective time-sequence of activity probability values. The time sequence can be analyzed for peaks or extended periods of high probabilities. In some embodiments the number of peaks or extended periods of high probabilities indicates the number of repetitions (e.g., a repetition is indicated if the probability is greater than a threshold probability for longer than a threshold length of time). In another embodiment, during extended periods of high probabilities, the state vector $\theta_t$ is processed to count a number of rotations around the torus. This count is interpreted as the number of completed repetitions.

(ii) Activity Quality Measurement

Received sensor data is analyzed by one or more activity filters. An activity detector, such as the activity detector 114 of FIG. 1, outputs, for each activity filter, a respective time-sequence of activity probability values. If sensor data is determined to be associated with a particular activity the probability value of that corresponding activity filter may be used as an analog for activity quality. This is true as long as the activity filter was generated using sensor data indicative of a high quality (good form) execution of the activity. In embodiments in which a plurality of activity filters are provided, each being associated with the same activity class, the activity quality may be based on respective activity probabilities associated with the plurality of activity filters. An activity class includes at least one "good form" activity filter and at least one "poor form" activity filter. It is clear that higher activity probabilities in the "good form" activity filters contribute towards a higher activity quality and higher activity probabilities in the "poor form" activity filters contribute towards a lower activity quality.

(iii) Activity Likelihood Determination

Received sensor data is analyzed by one or more activity filters. An activity detector, such as the activity detector 114 of FIG. 1, outputs, for each activity filter, a respective time-sequence of activity probability values. In this scenario, future-activity filters are generated using sensor data that is captured before a future activity. In one example, the future-activity is an earthquake having at particular value or range or values on the Richter scale. Historical seismological data immediately preceding past earthquakes is used to generate the future-activity filter. Different amounts of sensor data (e.g., 10 years prior, 10 days prior, 10 hours prior, etc.) may be used to generate multiple future-activity filters, each filter corresponding with the same future activity (the earthquake). Current data may be analyzed by these future-activity filters in an attempt to provide an accurate future-activity probability. This form of predictive analysis has value is the fields of financial market analysis, meteorology, seismology, etc. In another example, motion sensors outfitted on an elderly person collect data over an extended period of time. At some point in time, the elderly person falls down, possibly due to fatigue. The sensor data immediately preceding the fall is used to generate the future-activity filter. Different amounts of sensor data (e.g., 10 hours prior, 10 minutes prior, 10 seconds prior, etc.) may be used to generate multiple future-activity filters, each filter corresponding with the same future activity (the fall). The elderly person will continue to wear the sensors and will receive an indication if one of the multiple future-activity filters indicates a high probability of another fall.

(iv) Failure Mode Detection and Responsive Action

Received sensor data is analyzed by one or more activity filters. An activity detector, such as the activity detector 114 of FIG. 1, outputs, for each activity filter, a respective time-sequence of activity probability values. If an activity filter corresponding to a failure mode of a mechanical system is associated with activity probability values greater than a threshold value, for longer than a threshold amount of time, a responsive action is taken. For example, the system and processes described herein may transmit, via a communication interface, a terminate-operation command to the mechanical system in the failure mode so as to prevent further damage. Other forms of responsive action may be carried out as well such as transmitting, via a communication interface, a failure-mode notification to a user equipment of a mechanical-system operator, the notification to be indicated via a user interface of the user equipment.

(v) Gesture Detection and Responsive Action

Received sensor data is analyzed by one or more activity filters. An activity detector, such as the activity detector 114 of FIG. 1, outputs, for each activity filter, a respective time-sequence of activity probability values. If an activity filter corresponding to a gesture is associated with activity probability values greater than a threshold value, for longer than a threshold amount of time, a responsive action is taken. For example, the system and processes described herein may transmit, via a communication interface, a standard input signal to a computing device such as those produced by a keystroke or a mouse movement. Other forms of responsive action may be carried out as well such as transmitting, via a communication interface, a standard input signal to a robotic device such as those used to control the motion of servo-motors and linear actuators. Other forms of responsive action may be carried out as well such as transmitting, via a communication interface, an input signal to a smartphone application for causing the smartphone activation to output a particular sound (e.g., a guitar chord) and/or image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

EMBODIMENTS

At least one embodiment takes the form of a process for generating a gesture-detection (GD) filter. The process includes receiving sensor data captured by at least one sensor during a gesture, the at least one sensor selected from the group consisting of (i) a motion sensor that is attached to a user, (ii) a motion sensor that is attached to a user equipment, and (iii) an audio sensor, the sensor data including a plurality of sequential sensor measurements. The process also includes determining a set of activity frequencies associated with the sensor data received during the gesture. The process also includes iteratively calculating (i) a prediction error based on a difference between at least one of the plurality of sequential sensor measurements and an observation prediction $\hat{h}_t$ from an observation model, the observation model operating on phases in a set of phases associated with the set of activity frequencies, (ii) an updated set of estimated activity phases based on the prediction error and the set of activity frequencies, and (iii) an updated observation function of the observation model based on the prediction error. The process also includes generating the GD filter based at least in part of the set of activity frequencies and the updated observation function.

At least one embodiment takes the form of a process for generating a gesture-detection (GD) filter. The process includes receiving sensor data, captured by at least one sensor over a plurality of time intervals, the at least one sensor selected from the group consisting of (i) a motion sensor that is attached to a user, (ii) a motion sensor that is attached to a user equipment, and (iii) and audio sensor, each of the time intervals in the plurality of time intervals corresponding with at least one repetition of a respective gesture, the sensor data including a plurality of sequential sensor measurements. The process also includes selecting a subset of time intervals from the plurality of time intervals, each time interval in the selected subset of time intervals corresponding with at least one repetition of a common gesture. The process also includes determining a set of activity frequencies associated with the sensor data captured during the selected subset of time intervals. The process also includes iteratively calculating (i) a prediction error based on a difference between at least one of the plurality of sequential sensor measurements and an observation prediction $\hat{h}_t$ from an observation model, the observation model operating on phases in a set of phases associated with the set of activity frequencies, (ii) an updated set of estimated activity phases based on the prediction error and the set of activity frequencies, and (iii) an updated observation function of the observation model based on the prediction error. The process also includes generating the GD filter based at least in part of the set of activity frequencies and the updated observation function.

In at least one embodiment the set of activity frequencies is determined using one of time-frequency analysis, least-squares algorithm, singular value decomposition, and compressed sensing algorithm.

In at least one embodiment the observation function is represented as a set of coefficients and corresponding basis functions of phases of the activity frequencies.

In at least one embodiment the basis functions of phases are sine functions and cosine functions of the phases of the activity frequencies.

In at least one embodiment calculating an updated set of estimated activity phases is performed using a particle filter algorithm, and the set of estimated activity phases is based on a plurality of particle phase vectors.

In at least one such embodiment the plurality of particle phase vectors are used to determine an observation prediction.

In at least one embodiment the prediction error is a particle-specific prediction error, and is also based on a particle-specific observation function output associated with a respective particle.

In at least one embodiment the particle-specific prediction error is based on a difference between at least one of the plurality of sequential observation measurements and an average of (i) an observation prediction and (ii) the particle-specific observation prediction.

In at least one embodiment calculating an updated set of estimated activity phases is performed using an extended Kalman filter algorithm.

In at least one embodiment the updated observation function is determined using a set of basis functions.

In at least one embodiment the basis functions are a set of Fourier modes.

In at least one embodiment the basis functions are a set of wavelets.

In at least one embodiment the updated observation function is determined by updating basis coefficients of the basis functions.

In at least one embodiment each basis coefficient is updated based on a prediction error.

In at least one embodiment the expected value of the observation prediction is based on an average of the observation function operating on a plurality of activity phase particles.

In at least one embodiment the expected value of the observation prediction is based on an extended Kalman filter.

In at least one embodiment each basis coefficient is updated with a weighting factor that decreases in magnitude over time.

In at least one embodiment each basis vector coefficient is updated based on a magnitude of the expected value of a corresponding basis vector.

In at least one embodiment the expected value of a corresponding basis vector is calculated using a feedback particle filter.

In at least one embodiment the expected value of a corresponding basis vector is calculated based on an average of the corresponding basis vector for a plurality of activity phase particles.

In at least one embodiment the expected value of a corresponding basis vector is calculated using an extended Kalman filter.

In at least one embodiment the process further includes determining a convergence of the observation function. In at least one such embodiment generating the GD filter based at least in part of the set of activity frequencies and the updated observation function is carried out in response to the determined convergence of the observation function.

In at least one embodiment generating the GD filter based at least in part of the set of activity frequencies and the updated observation function is carried out in response to receiving a generate-filter command. In at least one such embodiment receiving includes receiving via a user interface.

In at least one embodiment the gesture is a physical gesture. In at least one embodiment the physical gesture is selected from the group consisting of (i) a single-hand gesture, (ii) a two-hand gesture, (iii) a head gesture, (iv) a full body gesture, and (v) a user-equipment assisted gesture.

In at least one embodiment the gesture is an audible gesture. In at least one embodiment the audible gesture is selected from the group consisting of (i) a spoken word, (ii) a spoken phrase, (iii) a vocal sound, (iv) a vocal sound pattern, (v) a tone of voice, (vi) a tonal vocal pattern, and (vii) a non-vocal user-produced sound.

In at least one embodiment the gesture is a mental gesture. In at least one embodiment the mental gesture is selected from the group consisting of (i) a thought of a user, (ii) a thought pattern of the user, (iii) an externally induced thought of the user, and (iv) an externally induced thought pattern of the user.

In at least one embodiment the at least one sensor includes at least one single-axis accelerometer.

In at least one embodiment the at least one sensor includes at least one three-axis accelerometer array.

In at least one embodiment the at least one sensor includes at least one emitter and at least one corresponding detector, the at least one emitter selected from the group consisting of (i) an emitter that is attached to a user and (ii) an emitter that is attached to a user equipment, wherein the detector detects a signal emitted by the emitter and produces sensor data based at least in part on an amplitude of the detected signal.

In at least one embodiment the at least one sensor includes at least one emitter and at least one corresponding detector, the at least one emitter selected from the group consisting of (i) an emitter that is attached to a user and (ii) an emitter that is attached to a user equipment, wherein the detector detects a signal emitted by the emitter and produces sensor data based at least in part on a phase of the detected signal.

In at least one embodiment the at least one sensor includes at least one emitter and at least one corresponding detector, the at least one emitter selected from the group consisting of (i) an emitter that is attached to a user and (ii) an emitter that is attached to a user equipment, wherein the detector detects a signal emitted by the emitter and produces sensor data based at least in part on a frequency decomposition of the detected signal.

In at least one embodiment the at least one sensor includes a gyroscope.

In at least one embodiment the at least one sensor includes a microphone.

In at least one embodiment the at least one sensor includes a microphone array.

In at least one embodiment the process further includes uploading the generated GD filter to a cloud database of GD filters.

In at least one embodiment the process further includes comparing the generated GD filter with a set of previously generated and named GD filters, determining a most-likely name for the generated GD filter based on the comparison, and naming the generated GD filter with the determined most-likely name.

In at least one embodiment the gesture is associated with a robotic-system task. In at least one embodiment the robotic system task is a robotic system task selected from the group consisting of (i) activating a servo-motor to rotate in a certain direction, (ii) activating a servo-motor to rotate through a certain angle, (iii) activating a servo-motor to rotate at a certain speed, (iv) activating a linear actuator to move in a certain direction, (v) activating a linear actuator to move a certain distance, (vi) activating a linear actuator to move at a certain speed, (vii) activating a motor to rotate in a certain direction, and (viii) activating a motor to rotate at a certain speed.

In at least one embodiment the gesture is associated with a computer task. In at least one such embodiment the computer task is a computer task selected from the group consisting of (i) opening an application, (ii) closing an application, (iii) minimizing an application, (iv) navigating a user interface, (v) a multimedia-playback control, (vi) a text input.

In at least one embodiment the process further includes receiving an indication of the respective corresponding gesture of at least one time interval. In at least one such embodiment receiving includes receiving via a user interface.

In at least one embodiment the process further includes determining at least one subset of time intervals by performing a grouping of the time intervals, the grouping being based at least in part on the received sensor data captured during the time intervals, and wherein selecting the subset of time intervals from the plurality of time intervals includes selecting a determined subset.

In at least one embodiment the process further includes determining at least one subset of time intervals by performing a grouping of the time intervals, the grouping being based at least in part on temporary GD filters generated using sensor data captured during single time intervals, and wherein selecting the subset of time intervals from the plurality of time intervals comprises selecting a determined subset.

At least one embodiment takes the form of system including a tangible computer-readable medium having instructions stored thereon that when executed cause a processor to perform at least one of the above listed processes or a combination thereof.

REFERENCES

[1] P. Kahn, A. Kinsolving, M. A. Christensen, B. Y. Lee, and D. Vogel. Sensor fusion for activity identification. Patent Application, September 2012. US 2012/0232432 A1.

[2] L. Bao and S. S. Intille. Activity recognition from user-annotated acceleration data. In A. Ferscha and F. Mattern, editors, Pervasive Computing, volume 3001 of Lecture Notes in Computer Science, pages 1-17. Springer Berlin Heidelberg, 2004.

[3] E. M. Tapia. Using Machine Learning for Real-time Activity Recognition and Estimation of Energy Expenditure. PhD thesis, Massachusetts Institute of Technology, 2008.

[4] T. Choudhury, S. Consolvo, B. Harrison, J. Hightower, A. LaMarca, L. LeGrand, A. Rahimi, A. Rea, G. Bordello, B. Hemingway, P. Klasnja, K. Koscher, J. Landay, J. Lester, D. Wy-att, and D. Haehnel. The mobile sensing platform: An embedded system for capturing and recognizing human activities. IEEE Pervasive Computing, 7(2):32-41, 2008.

[5] U. Maurer, A. Smailagic, D. P. Siewiorek, and M. Deisher. Activity recognition and monitoring using multiple sensors on different body positions. In International Workshop on Wearable and Implantable Body Sensor Networks (BSN 2006), pages 99-102, 2006.

[6] M. Berchtold, M. Budde, D. Gordon, H. R. Schmidtke, and M. Beigl. ActiServ: Activity recog-nition service for mobile phones. In 2010 International Symposium on Wearable Computers (ISWC), pages 1-8, 2010.

[7] D. Riboni and C. Bettini. COSAR: hybrid reasoning for context-aware activity recognition. Personal Ubiquitous Computation, 15(3):271-289, March 2011.

[8] O. D. Lara and M. A. Labrador. A mobile platform for real-time human activity recognition. In 2012 IEEE Consumer Communications and Networking Conference (CCNC), pages 667-671, 2012.

[9] 0. D. Lara, A. J. Perez, M. A. Labrador, and J. D. Posada. Centinela: A human activity recognition system based on acceleration and vital sign data. Pervasive and Mobile Computing, 8(5):717-729, 2012.

[10] T.-P. Kao, C.-W. Lin, and J.-S. Wang. Development of a portable activity detector for daily activity recognition. In IEEE International Symposium on Industrial Electronics (ISIE 2009), pages 115-120, 2009.

[11] Y. Hanai, J. Nishimura, and T. Kuroda. Haar-like filtering for human activity recognition using 3d accelerometer. In Proceedings of the 13th IEEE Digital Signal Processing Workshop, pages 675-678, 2009.

[12] A. M. Khan, Y.-K. Lee, S. Y. Lee, and T.-S. Kim. A triaxial accelerometer-based physical-activity recognition via augmented-signal features and a hierarchical recognizer. IEEE Trans-actions on Information Technology in Biomedicine, 14(5):1166-1172, 2010.

[13] T. Brezmes, J.-L. Gorricho, and J. Cotrina. Activity recognition from accelerometer data on a mobile phone. In Distributed Computing, Artificial Intelligence, Bioinformatics, Soft Computing, and Ambient Assisted Living, volume 5518 of Lecture Notes in Computer Science, pages 796-799. Springer Berlin Heidelberg, 2009.

[14] N. Pham and T. Abdelzaher. Robust dynamic human activity recognition based on relative energy allocation. In S. E. Nikoletseas, B. S. Chlebus, D. B. Johnson, and B. Krishnamachari, editors, Distributed Computing in Sensor Systems, volume 5067 of Lecture Notes in Computer Science, pages 525-530. Springer Berlin Heidelberg, 2008.

[15] Z. He and L. Jin. Activity recognition from acceleration data based on discrete cosine transform and SVM. In IEEE International Conference on Systems, Man and Cybernetics (SMC 2009), pages 5041-5044, 2009.

[16] M. Stikic, D. Larlus, S. Ebert, and B. Schiele. Weakly supervised recognition of daily life activ-ities with wearable sensors. IEEE Transactions on Pattern Analysis and Machine Intelligence, 33(12):2521-2537, 2011.

[17] I. Guyon and A. Elisseeff. An introduction to variable and feature selection. The Journal of Machine Learning Research, 3:1157-1182, 2003.

[18] R. T. Olszewski. Generalized feature extraction for structural pattern recognition in time-series data. PhD thesis, Carnegie Mellon University, 2001.

[19] S.-W. Lee and K. Mase. Recognition of walking behaviors for pedestrian navigation. In Proceedings of the IEEE International Conference on Control Applications (CCA 2001), pages 1152-1155, 2001.

[20] J. Parkka, M. Ermes, P. Korpipaa, J. Mantyjarvi, J. Peltola, and I. Korhonen. Activity classification using realistic data from wearable sensors. IEEE Transactions on Information Technology in Biomedicine, 10(1):119-128, 2006.

[21] Z. He, Z. Liu, L. JIN, L. Zhen, and J. Huang. Weightlessness feature—a novel feature for single tri-axial accelerometer based activity recognition. In 19th International Conference on Pattern Recognition (ICPR 2008), pages 1-4, 2008.

[22] M. Ermes, J. Parkka, and L. Cluitmans. Advancing from offline to online activity recognition with wearable sensors. In 30th IEEE Annual International Conference of Engineering in Medicine and Biology Society (EMBS 2008), pages 4451-4454, 2008.

[23] D. Ormoneit, H. Sidenbladh, M. J. Black, and T. Hastie. Learning and tracking cyclic human motion. In Proceedings of Neural Information Processing Systems (NIPS), pages 894-900. The MIT Press, 2001.

[24] Y.-P. Chen, J.-Y. Yang, S.-N. Liou, G.-Y. Lee, and J.-S. Wang. Online classifier construction algorithm for human activity detection using a tri-axial accelerometer. Applied Mathematics and Computation, 205(2):849-860, 2008.

[25] L. C. Jatoba, U. Grossmann, C. Kunze, J. Ottenbacher, and W. Stork.
Context-aware mobile health monitoring: Evaluation of different pattern recognition methods for classification of physical activity. In 30th IEEE Annual International Conference of Engineering in Medicine and Biology Society (EMBS 2008), pages 5250-5253, 2008.

[26] 0. D. Lara and M. A. Labrador. A survey on human activity recognition using wearable sensors. IEEE Communications Surveys Tutorials, 15(3):1192-1209, 2013.

[27] J. R. Quinlan. C4.5: programs for machine learning. Morgan Kaufmann Publishers Inc., San Francisco, Calif., USA, 1993.

[28] I. H. Witten and E. Frank. Data Mining: Practical Machine Learning Tools and Techniques, Second Edition. Morgan Kaufmann Publishers Inc., San Francisco, Calif., USA, 2005.

[29] K. Altun and B. Barshan. Human activity recognition using inertial/magnetic sensor units. In Human Behavior Understanding, volume 6219 of Lecture Notes in Computer Science, pages 38-51. Springer Berlin Heidelberg, 2010.

[30] P. Antal. Construction of a classifier with prior domain knowledge formalised as bayesian network. In Proceedings of the 24th IEEE Annual Conference of Industrial Electronics Society (IECON 1998), volume 4, pages 2527-2531, 1998.

[31] H. Zhang. The optimality of naive Bayes. In Proceedings of the 17th FLAIRS conference. AAAI Press, 2004.

[32] Z. Y. He and L. W. Jin. Activity recognition from acceleration data using ar model repre-sentation and SVM. In 2008 International Conference on Machine Learning and Cybernetics, volume 4, pages 2245-2250, 2008.

[33] C. Cortes and V. Vapnik. Support-vector networks. Machine Learning, 20(3):273-297, 1995.

[34] S. Gallant. Perception-based learning algorithms. IEEE Transactions on Neural Networks, 1(2):179-191, 1990.

[35] F. Foerster, M. Smeja, and J. Fahrenberg. Detection of posture and motion by accelerometry: a validation study in ambulatory monitoring. Computers in Human Behavior, 15(5):571-583, 1999.

[36] E. M. Tapia, S. S. Intille, W. Haskell, K. Larson, J. Wright, A. King, and R. Friedman. Real-time recognition of physical activities and their intensities using wireless accelerometers and a heart rate monitor. In 11th IEEE International Symposium on Wearable Computers, pages 37-40, 2007.
[37] J. Cheng, O. Amft, and P. Lukowicz. Active capacitive sensing: Exploring a new wearable sensing modality for activity recognition. In Pervasive Computing, volume 6030 of Lecture Notes in Computer Science, pages 319-336. Springer Berlin Heidelberg, 2010.
[38] C. Zhu and W. Sheng. Human daily activity recognition in robot-assisted living using multi-sensor fusion. In IEEE International Conference on Robotics and Automation (ICRA 2009), pages 2154-2159, 2009.
[39] M. Stikic, D. Larlus, and B. Schiele. Multi-graph based semi-supervised learning for activity recognition. In International Symposium on Wearable Computers (ISWC 2009), pages 85-92, 2009.
[40] M. Kadous. Temporal Classification: Extending the Classification Paradigm to Multivariate Time Series. PhD thesis, University of New South Wales, 2002.
[41] L. Rabiner. A tutorial on hidden Markov models and selected applications in speech recogni-tion. Proceedings of the IEEE, 77(2):257-286, 1989.
[42] D. Mumford and A. Desolneux. Pattern Theory: The Stochastic Analysis of Real-World Signals. A K Peters, Ltd., Natick, Mass., 2010.
[43] U. Grenander and M. Miller. Pattern Theory: From Representation to Inference. Oxford University Press, New York, 2007.

What is claimed is:

1. A method for generating a gesture-detection (GD) filter comprising:
    receiving sensor data captured by at least one sensor during a gesture, the at least one sensor selected from the group consisting of (i) a motion sensor that is attached to a user, (ii) a motion sensor that is attached to a user equipment, (iii) an audio sensor, and (iv) an electrode array attached to a head of the user, the sensor data comprising a plurality of sequential sensor measurements;
    determining a set of activity frequencies associated with the sensor data received during the gesture;
    iteratively calculating:
        (i) a prediction error based on a difference between at least one of the plurality of sequential sensor measurements and an observation prediction $\hat{h}_r$ from an observation model, the observation model operating on phases in a set of phases associated with the set of activity frequencies;
        (ii) an updated set of estimated activity phases based on the prediction error and the set of activity frequencies;
        (iii) an updated observation function of the observation model based on the prediction error; and
    generating the GD filter based at least in part of the set of activity frequencies and the updated observation function.

2. The method of claim 1 further comprising:
    determining a convergence of the observation function.

3. The method of claim 2 wherein generating the GD filter based at least in part of the set of activity frequencies and the updated observation function is carried out in response to the determined convergence of the observation function.

4. The method of claim 1 wherein generating the GD filter based at least in part of the set of activity frequencies and the updated observation function is carried out in response to receiving a generate-filter command.

5. The method of claim 1 wherein the gesture is a physical gesture.

6. The method of claim 5 wherein the physical gesture is selected from the group consisting of (i) a single-hand gesture, (ii) a two-hand gesture, (iii) a head gesture, (iv) a full body gesture, and (v) a user-equipment assisted gesture.

7. The method of claim 1 wherein the gesture is an audible gesture.

8. The method of claim 7 wherein the audible gesture is selected from the group consisting of (i) a spoken word, (ii) a spoken phrase, (iii) a vocal sound, (iv) a vocal sound pattern, (v) a tone of voice, (vi) a tonal vocal pattern, and (vii) a non-vocal user-produced sound.

9. The method of claim 1 wherein the gesture is a mental gesture.

10. The method of claim 9 wherein the mental gesture is selected from the group consisting of (i) a thought of a user, and (ii) a thought pattern of the user.

11. The method of claim 1 wherein the at least one sensor comprises an accelerometer.

12. The method of claim 1 wherein the at least one sensor comprises a gyroscope.

13. The method of claim 1 wherein the at least one sensor comprises a microphone.

14. The method of claim 1, wherein the gesture is associated with a computer task.

15. The method of claim 14 wherein the computer task is a computer task selected from the group consisting of (i) opening an application, (ii) closing an application, (iii) minimizing an application, (iv) navigating a user interface, (v) a multimedia-playback control, (vi) a text input.

16. The method of claim 1, wherein the gesture is associated with a robotic-system task.

17. The method of claim 16 wherein the robotic system task is a robotic system task selected from the group consisting of (i) activating a servo-motor to rotate in a certain direction, (ii) activating a servo-motor to rotate through a certain angle, (iii) activating a servo-motor to rotate at a certain speed, (iv) activating a linear actuator to move in a certain direction, (v) activating a linear actuator to move a certain distance, (vi) activating a linear actuator to move at a certain speed, (vii) activating a motor to rotate in a certain direction, and (viii) activating a motor to rotate at a certain speed.

18. The method of claim 1 further comprising:
    uploading the generated GD filter to a cloud database of GD filters.

19. The method of claim 1 further comprising:
    comparing the generated GD filter with a set of previously generated and named GD filters;
    determining a most-likely name for the generated GD filter based on the comparison; and
    naming the generated GD filter with the determined most-likely name.

20. An apparatus comprising a non-transitory computer-readable medium having instructions stored thereon that when executed cause a processor to:
    receive sensor data captured by at least one sensor during a gesture, the at least one sensor selected from the group consisting of (i) a motion sensor that is attached to a user, (ii) a motion sensor that is attached to a user equipment, and (iii) an audio sensor, the sensor data comprising a plurality of sequential sensor measurements;

determine a set of activity frequencies associated with the sensor data received during the gesture;
iteratively calculate:
(i) a prediction error based on a difference between at least one of the plurality of sequential sensor measurements and an observation prediction $\hat{h}_r$ from an observation model, the observation model operating on phases in a set of phases associated with the set of activity frequencies;
(ii) an updated set of estimated activity phases based on the prediction error and the set of activity frequencies;
(iii) an updated observation function of the observation model based on the prediction error; and
generate the GD filter based at least in part of the set of activity frequencies and the updated observation function.

* * * * *